United States Patent
Yanai et al.

(10) Patent No.: US 11,212,415 B2
(45) Date of Patent: Dec. 28, 2021

(54) IMAGE PROCESSING APPARATUS, IMAGE PROCESSING METHOD, STORAGE MEDIUM, AND IMAGE FORMING APPARATUS

(71) Applicant: CANON KABUSHIKI KAISHA, Tokyo (JP)

(72) Inventors: Tomokazu Yanai, Yokohama (JP); Hisashi Ishikawa, Urayasu (JP); Satoshi Wada, Machida (JP); Takeshi Yazawa, Kawasaki (JP); Tetsuya Suwa, Yokohama (JP); Hidetsugu Kagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/872,588

(22) Filed: May 12, 2020

(65) Prior Publication Data
US 2020/0274985 A1    Aug. 27, 2020

Related U.S. Application Data

(63) Continuation of application No. PCT/JP2018/038589, filed on Oct. 17, 2018.

(30) Foreign Application Priority Data

Nov. 17, 2017    (JP) .............................. JP2017-221969

(51) Int. Cl.
G06F 15/00    (2006.01)
H04N 1/23    (2006.01)
(Continued)

(52) U.S. Cl.
CPC ......... H04N 1/233 (2013.01); H04N 1/00395 (2013.01); H04N 1/2315 (2013.01);
(Continued)

(58) Field of Classification Search
CPC .. H04N 1/233; H04N 1/00395; H04N 1/2315; H04N 1/407; H04N 1/603; H04N 1/6086; H04N 1/6088
(Continued)

(56) References Cited

U.S. PATENT DOCUMENTS 6,445,452 B1    9/2002    Kondou
6,961,037 B2    11/2005    Kuwata
(Continued)

FOREIGN PATENT DOCUMENTS

CN    1260876 A    7/2000
CN    1619637 A    5/2005
(Continued)

OTHER PUBLICATIONS

International Search Report issued in Intl. Appln. No PCT/JP2018/038589 dated Jan. 15, 2019. English translation provided.
(Continued)

Primary Examiner — Mark R Milia
(74) Attorney, Agent, or Firm — Rossi, Kimms & McDowell LLP

(57) ABSTRACT

Disclosed is an image processing apparatus including: a derivation unit configured to derive a target luminance characteristic based on a viewing condition of an image and a print luminance characteristic predicted based a reflection characteristic corresponding to data thereon; a unit configured to generate print image data on an image by converting input image data by using a tone conversion characteristic that is set based on these characteristics, in which the derivation unit derives, in a case where a reproduction range of an illumination intensity in the print luminance characteristic is different, the target luminance characteristic so that a liner area of an output luminance in a case where the reproduction range is relatively large becomes large.

19 Claims, 22 Drawing Sheets

(51) Int. Cl.
*H04N 1/00* (2006.01)
*H04N 1/407* (2006.01)
*H04N 1/60* (2006.01)

(52) U.S. Cl.
CPC ............. *H04N 1/407* (2013.01); *H04N 1/603* (2013.01); *H04N 1/6086* (2013.01); *H04N 1/6088* (2013.01)

(58) Field of Classification Search
USPC ....................................................... 358/1.13
See application file for complete search history.

(56) References Cited

U.S. PATENT DOCUMENTS

| | | |
|---|---|---|
| 7,639,390 B2 | 12/2009 | Yamada |
| 7,982,908 B2 | 7/2011 | Kita |
| 8,416,455 B2 | 4/2013 | Sawada |
| 2005/0275911 A1* | 12/2005 | Yamada ................. H04N 9/735 358/518 |
| 2012/0268759 A1 | 10/2012 | Ono |
| 2015/0375549 A1 | 12/2015 | Martinez |

FOREIGN PATENT DOCUMENTS

| | | |
|---|---|---|
| CN | 1694488 A | 11/2005 |
| JP | 2003219176 A | 7/2003 |
| JP | 2010178149 A | 8/2010 |
| JP | 2016054356 A | 4/2016 |

OTHER PUBLICATIONS

Written Opinion issued in Intl. Appln. No. PCT/JP2018/038589 dated Jan. 15, 2019.
Office Action issued in Chinese Appln. No. 201880073282.4 dated May 10, 2021. English translation provided.

* cited by examiner

| LUMINANCE LINEAR INPUT VALUE (R,G,B) | PRINTED MATERIAL REFLECTION CHARACTERISTIC (DIFFUSE REFLECTION CHARACTERISTIC) | | |
|---|---|---|---|
| | X (PdX) | Y (PdY) | Z (PdZ) |
| 255,255,255 | 83.5 | 90.3 | 79.2 |
| 192,192,192 | 59.8 | 65.4 | 56.9 |
| 128,128,128 | 38.4 | 40.7 | 38.9 |
| 64,64,64 | 18.3 | 21.1 | 16.8 |
| 0,0,0 | 0.76 | 0.77 | 0.75 |

| LUMINANCE LINEAR INPUT VALUE (R,G,B) | PRINTED MATERIAL REFLECTION CHARACTERISTIC | | | | | | |
|---|---|---|---|---|---|---|---|
| | DIFFUSE REFLECTION CHARACTERISTIC | | | SPECULAR REFLECTION CHARACTERISTIC | | | |
| | X (PdX) | Y (PdY) | Z (PdZ) | X (RdX) | Y (RdY) | Z (RdZ) | |
| 255,255,255 | 83.5 | 90.3 | 79.2 | 2879.5 | 3020.4 | 2636.8 | |
| 192,192,192 | 59.8 | 65.4 | 56.9 | 6735.7 | 6984.1 | 6174.5 | |
| 128,128,128 | 38.4 | 40.7 | 38.9 | 7445.1 | 7736.8 | 7569.2 | |
| 64,64,64 | 18.3 | 21.1 | 16.8 | 4315.8 | 5819.2 | 5503.5 | |
| 0,0,0 | 0.76 | 0.77 | 0.75 | 8250.2 | 8250.2 | 7877.8 | |

| LUMINANCE LINEAR INPUT VALUE (R,G,B) | PRINTED MATERIAL REFLECTION CHARACTERISTIC ||||||
|---|---|---|---|---|---|---|
| | DIFFUSE REFLECTION CHARACTERISTIC ||| SPECULAR REFLECTION CHARACTERISTIC |||
| | X (PdX) | Y (PdY) | Z (PdZ) | X (RdX) | Y (RdY) | Z (RdZ) |
| 255,255,255 | 83.5 | 90.3 | 79.2 | 2879.5 | 3020.4 | 2636.8 |
| 192,192,192 | 59.8 | 65.4 | 56.9 | – | – | – |
| 128,128,128 | 38.4 | 40.7 | 38.9 | 7445.1 | 7736.8 | 7569.2 |
| 64,64,64 | 18.3 | 21.1 | 16.8 | – | – | – |
| 0,0,0 | 0.76 | 0.77 | 0.75 | 8250.2 | 8250.2 | 7877.8 |

VIEWING ENVIRONMENT ACQUISITION

☑ CANDIDATE SELECTION

ILLUMINATION INTENSITY ▶
- VERY BRIGHT (DAYTIME OUTDOOR 10,000 lx)
- BRIGHT (ILLUMINATION IN ART MUSEUM 3,000 lx)
- MODERATE (OFFICE 800 lx)
- SLIGHTLY DARK (SLIGHTLY DARK OFFICE 400 lx)

LUMINANCE IN INCIDENCE ANGLE DIRECTION ▶
- VERY BRIGHT (WHITE 500 cd/m²)
- BRIGHT (BRIGHT GRAY 200 cd/m²)
- MODERATE (GRAY 50 cd/m²)
- DARK (BLACK 10 cd/m²)

☐ NUMERICAL VALUE SETTING 2500 lx
0 — 5000 — 10000

IN ORDER TO SET ACCURATE NUMERICAL VALUE, IT IS DESIRABLE TO INSTALL ILLUMINOMETER ON PAPER FOR MEASUREMENT 100 cd/m²
0 — 250 — 500

IN ORDER TO SET ACCURATE NUMERICAL VALUE, IT IS DESIRABLE TO PUT MIRROR OR THE LIKE ON SAMPLE SURFACE AND MEASURE LUMINANCE IN INCIDENCE ANGLE DIRECTION BY LUMINANCE METER

FIG.17

VIEWING ENVIRONMENT ACQUISITION

☑ CANDIDATE SELECTION

ILLUMINATION INTENSITY ▼
- VERY BRIGHT (DAYTIME OUTDOOR 10,000 lx)
- BRIGHT (ILLUMINATION IN ART MUSEUM 3,000 lx)
- MODERATE (OFFICE 800 lx)
- SLIGHTLY DARK (SLIGHTLY DARK OFFICE 400 lx)

BACKGROUND LUMINANCE OF NON-IMAGE PORTION ▼
- VERY BRIGHT (WHITE 500 cd/m²)
- BRIGHT (BRIGHT GRAY 200 cd/m²)
- MODERATE (GRAY 50 cd/m²)
- DARK (BLACK 10 cd/m²)

☐ NUMERICAL VALUE SETTING

ILLUMINATION INTENSITY
[ 2500 ] lx
0 — 5000 — 10000

IN ORDER TO SET ACCURATE NUMERICAL VALUE, IT IS DESIRABLE TO INSTALL ILLUMINOMETER ON PAPER FOR MEASUREMENT

BACKGROUND LUMINANCE
[ 25 ] cd/m²
0 — 50 — 100

IN ORDER TO SET ACCURATE NUMERICAL VALUE, IT IS DESIRABLE TO INSTALL ILLUMINANCE METER ON BACKGROUND OF NON-IMAGE PORTION FOR MEASUREMENT

FIG.20

IMAGE PROCESSING APPARATUS, IMAGE PROCESSING METHOD, STORAGE MEDIUM, AND IMAGE FORMING APPARATUS

CROSS-REFERENCE TO RELATED APPLICATIONS

This application is a Continuation of International Patent Application No. PCT/JP2018/038589, filed Oct. 17, 2018, which claims the benefit of Japanese Patent Application No. 2017-221969, filed Nov. 17, 2017, both of which are hereby incorporated by reference herein in their entirety.

BACKGROUND OF THE INVENTION

Field of the Invention

The present disclosure relates to a technique for generating an image in which a visual change depending on the viewing environment is suppressed.

Background Art

Conventionally, image forming apparatuses prevail, such as a digital copy machine and a printer, using a variety of printing methods, such as ink jet, electrophotography, and thermal transfer. Further, it is known that the visual density (color) of a printed material produced by using these image forming apparatuses changes depending on the viewing environment. Here, as one viewing environment, for example, there is an illumination intensity of illumination installed in the viewing environment and an image processing technique has been proposed, which causes a viewer to perceive a printed material as intended by a producer by suppressing a change in visual density of the printed material even in a case where the illumination intensity changes (Patent Literature 1).

Patent Literature 1 has disclosed an image processing technique that outputs image data for forming an image to be arranged in the viewing environment in the image output mode selected in accordance with the reflected light of the image under the viewing condition, which is calculated based on the reflection characteristic of the image.

CITATION LIST

Patent Literature

PTL 1 Japanese Patent Laid-Open No. 2016-054356

SUMMARY OF THE INVENTION

Note that, with the image processing technique disclosed in Patent Literature 1, at least in the viewing environment in which the illumination intensity is high, the portion from the halftone portion to the highlight portion of the printed material is overexposed, and therefore, the printed material is perceived as if it were captured in the state where the exposure is increased by a few stops. That is, there is such a problem that in a case where the illumination intensify becomes high, the appearance of a printed material changes.

The present disclosure provides a technique to generate an image in which a visual change depending on the viewing environment is suppressed.

The present disclosure is an image processing apparatus including: an image processing apparatus that generates, in accordance with intensity of light with which an image printed based on input image data is irradiated, print image data on the image from the input image data, and includes: an acquisition unit configured to acquire a viewing condition under which the image is viewed; a prediction unit configured to predict a print luminance characteristic corresponding to print image data on the image based on the viewing condition and a reflection characteristic corresponding to print image data on the image; a derivation unit configured to derive a target luminance characteristic under the viewing condition based on the print luminance characteristic; a setting unit configured to set a tone conversion characteristic that converts the input image data into print image data on the image based on the print luminance characteristic and the target luminance characteristic; and a generation unit configured to generate output image data on the image by converting the input image data by using the tone conversion characteristic, and the derivation unit drives, in a case where a reproduction range of an illumination intensity in the print luminance characteristic is different, the target luminance characteristic so that a linear area of an output luminance in a case where the reproduction range is relatively large is larger than a linear area of an output luminance in a case where the reproduction range is relatively small.

Further features of the present invention will become apparent from the following description of exemplary embodiments with reference to the attached drawings.

BRIEF DESCRIPTION OF THE DRAWINGS

FIG. 5 is a diagram showing a printed material reflection characteristic stored in a reflection characteristic storage unit;

FIG. 7 is a diagram showing a GUI provided by a viewing condition acquisition unit;

FIG. 15 is a diagram showing a printed material reflection characteristic stored in the reflection characteristic storage unit;

FIG. 16 is a diagram showing the printed material reflection characteristic stored in the reflection characteristic storage unit;

FIG. 17 is a diagram showing a GUI provided by the viewing condition acquisition unit;

FIG. 20 is a diagram showing a GUI provided by the viewing condition acquisition unit;

DESCRIPTION OF THE EMBODIMENTS

In the following, preferred embodiments of the present invention are explained in detail with reference to attached drawings. The following embodiments are not intended to limit the present invention and all combinations of features explained in the present embodiments are not necessarily indispensable to the solution of the present invention.

(Brightness of Printed Material Perceived Depending on Illumination Intensity)

Figure 1:
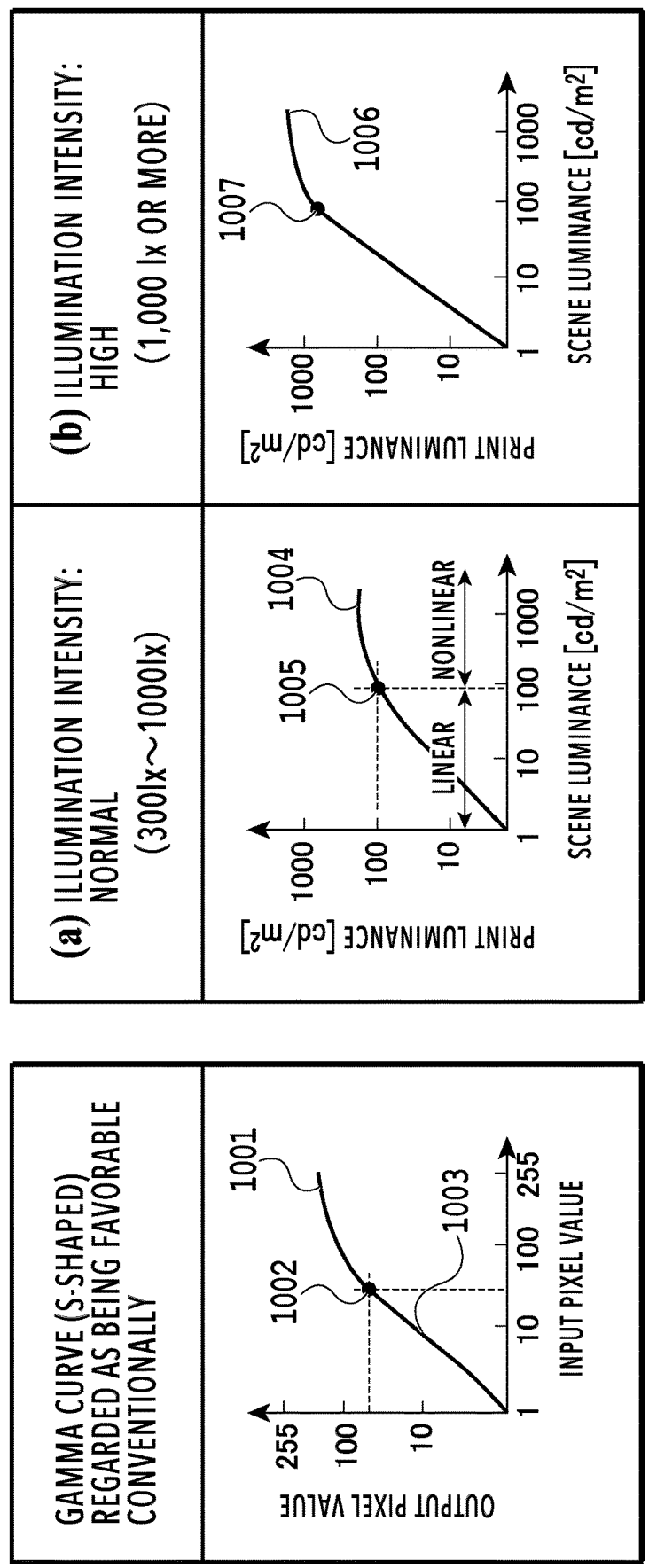
FIG. 1 is a diagram showing a print luminance that changes depending on an illumination intensity in a conventional gamma curve.

First, before explanation of the embodiments of the present invention, factors by which the brightness of a printed material is perceived differently depending on the illumination intensity in the viewing environment are explained by using FIG. 1. FIG. 1 is a diagram showing a relationship between a scene luminance [cd/m$^2$] and a print luminance [cd/m$^2$] in a case where the illumination intensity is set to (a) normal (300 to 1,000 [lx]) and in a case where it is set to (b) high (1,000 [lx] or more) by using an input/output characteristic gamma curve regarded as being favorable conventionally. In FIG. 1, a black circle "•" shown in the drawing indicates a skin area.

In the left field in the table in FIG. 1, an input/output characteristic gamma curve (S-shaped) 1001 regarded as being favorable conventionally indicates that the output pixel value is larger than the input pixel value. Specifically, in the portion from the halftone portion to the highlight portion, that is, in an area (1002) in which the curve is convex upward, the output pixel value is greater than the input pixel value. That is, the printed material becomes brighter.

Then, a relationship between the scene luminance [cd/m$^2$] and the print luminance [cd/m$^2$] in a case where the illumination intensity is set to (a) normal (300 to 1,000 [lx]) by using the input/output characteristic gamma curve (S-shaped) 1001 regarded as being favorable conventionally is shown in the center field in the table in FIG. 1.

By referring to the center field in the table in FIG. 1, it is known that the relationship between the scene luminance and the print luminance keeps linearity and the luminance values are about the same in the luminance range less than or equal to an important area (1005), such as the skin area. The reason for this is that the MAX value of the print luminance viewed in the normal illumination (300 to 1,000 [lx]) environment is 100 to 300 [cd/m$^2$] and this is generally narrow compared to the MAX value of the actual scene luminance (1,000 [cd/m$^2$] or more).

That is, although for the input/output characteristic gamma curve (S-shaped) 1004 regarded as being favorable conventionally, the output pixel value is set great compared to the input pixel value, the MAX value of the print luminance is as small as 100 to 300 [cd/m2]. Because of this, in the luminance range less than or equal to the important area (1005), such as the skin area, the slope of the scene luminance and that of the print luminance are substantially the same as a result.

An area 1003 in which the input/output characteristic gamma curve (S-shaped) 1001 regarded as being favorable conventionally is convex downward is the characteristic for correcting black floating of print to be linear. Because of this, in many cases, the print luminance in the shadow portion is kept linear with respect to the scene luminance as a result.

Further, a relationship between the scene luminance [cd/m2] and the print luminance [cd/m2] in a case where the illumination intensity is set to (b) high (1,000 [lx] or more) by using the input/output characteristic gamma curve (S-shaped) 1006 regarded as being favorable conventionally is shown in the right field in the table in FIG. 1.

By referring to the right field in the table in FIG. 1, it is known that the luminance values are not the same although the relationship between the scene luminance and the print luminance keeps linearity in the luminance range less than or equal to an important area (1007), such as the skin area. The reason for this is that the input/output characteristic gamma curve (S-shaped) 1006 regarded as being favorable conventionally is nonlinear and the output pixel value is set greater than the input pixel value. That is, despite that the MAX value of the print luminance and the MAX value of the scene luminance are substantially the same luminance values (about 1,000 [cd/m2]), the luminance value of the print luminance is obviously set greater by the input/output characteristic gamma curve (S-shaped) regarded as being favorable conventionally. Because of this, the printed material is viewed as if it were captured with the exposure being increased by a few stops. That is, the brightness of the printed material is viewed differently (the appearance is perceived differently) depending on the illumination intensity.

Then, in order to avoid that the brightness of a printed material is viewed (perceived) differently, it is necessary to predict in advance how the print luminance characteristic changes in accordance with the illumination intensity. It is possible to predict the print luminance characteristic at least from the print diffuse reflection characteristic and the illumination intensity. In addition, it is possible to predict the print luminance characteristic with a higher accuracy by using the print specular reflection characteristic and the light source distribution.

In the following, in a first embodiment, the print luminance perceived by a viewer is predicted by setting the illumination intensity in an illuminating apparatus as the illumination intensity and using the print diffuse reflection characteristic measured in advance. In addition, image processing for generating image data for print output in accordance with the viewing environment is explained.

First Embodiment (Configuration of Apparatus)

Figure 2:
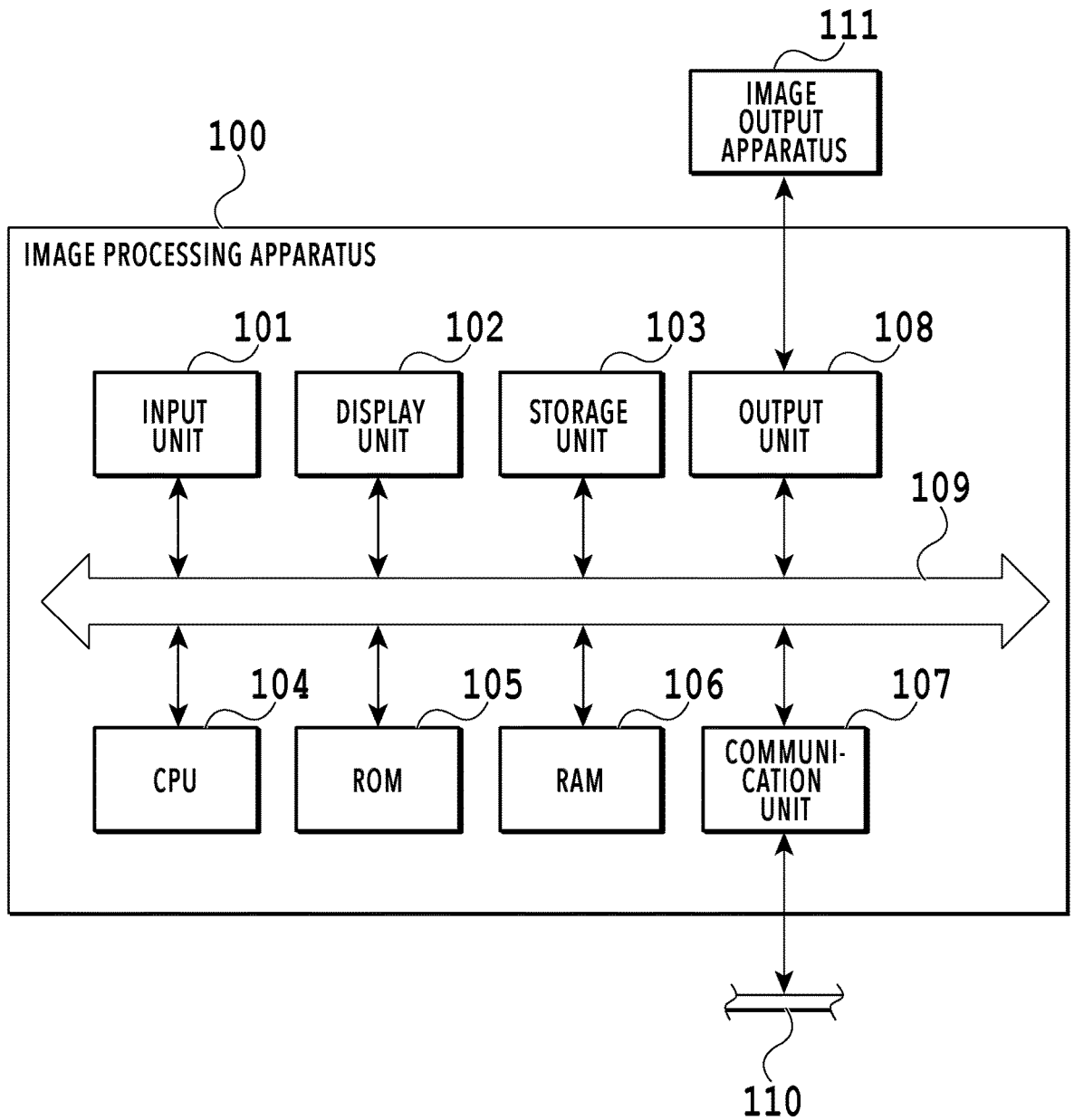
FIG. 2 is a block diagram of an image processing apparatus.

FIG. 2 is a block diagram showing an image processing apparatus according to the present embodiment. As shown in FIG. 2, an image processing apparatus 100 comprises an input unit 101, a display unit 102, a storage unit 103, a CPU 104, a ROM 105, a RAM 106, a communication unit 107, an output unit 108, and an image output apparatus 111. Further, those units are connected so as to be capable of communication by a system bus 109.

The image processing apparatus 100 is implemented by supplying programs for implementing image processing, to be described later, to a computer device, such as a personal computer, a tablet, and a smartphone.

The input unit 101 is a serial bus interface, such as USB (Universal Serial Bus). To the input unit 101, an input device, such as a keyboard and a mouse, and an image input device, such as a memory card reader, a digital camera, and a scanner, are connected.

The display unit 102 is a monitor or the like and displays user instructions and image data, which are input via the input unit 101 by the CPU 104, a graphical user interface (GUI), a processing progress of image processing, processing results, and the like. As described above, in a case where a table or a smartphone is made use of as the image processing apparatus 100, the input unit 101 and the display unit 102 are laminated and configured as a touch panel.

The storage unit 103 is a storage medium, such as a hard disk drive (HDD) and a solid state drive (SSD), in which various programs and a variety of kinds of data are stored. The programs stored in the storage unit 103 include programs for implementing image processing, to be described later.

The CPU (Central Processing Unit) 104 executes an OS (Operating System) and various programs stored in the storage unit 103 or the ROM 105 by using the RAM 106 as a work memory. Further, the CPU 104 communicates with a server apparatus or another computer device on a network 110 via the communication unit 107.

Specifically, the CPU 104 receives a variety of programs and data from the server apparatus, another computer device, and the like on the network 110, and performs processing, provides data on the processing results to the server apparatus or another computer device on the network 110, and so on. The computer device with which the CPU 104 can communicate includes the image output apparatus 111 and it is possible for the CPU 104 to output image data to the image output apparatus 111 via the communication unit 107. In addition, the CPU 104 controls configurations, to be described later, via the system bus 109.

The ROM (Read Only Memory) 105 stores the OS and various programs as described above. The RAM (Random Access Memory) 106 is used as a work memory for the CPU 104 to operate and further, used as an image memory for temporarily storing image data.

The communication unit 107 is a network interface for connecting to a wired or a wireless network, such as Ethernet (registered trademark), Bluetooth (registered trademark), Wi-Fi (registered trademark), and P2P.

The output unit 108 is a serial bus interface, such as USB, and outputs image data and the like to the image output apparatus 111 and a memory card writer, which are connected to the serial bus.

Although FIG. 2 shows an example in which the image processing apparatus 100 and the image output apparatus 111 are configured as separate apparatuses, it is possible to apply the present invention to an image forming apparatus that integrally configures the image processing apparatus 100 and the image output apparatus 111 into one apparatus. In addition, it is also possible to apply the present invention to an image copying apparatus comprising an image reading apparatus.

(Function Configuration of Image Processing Apparatus)

Figure 3:
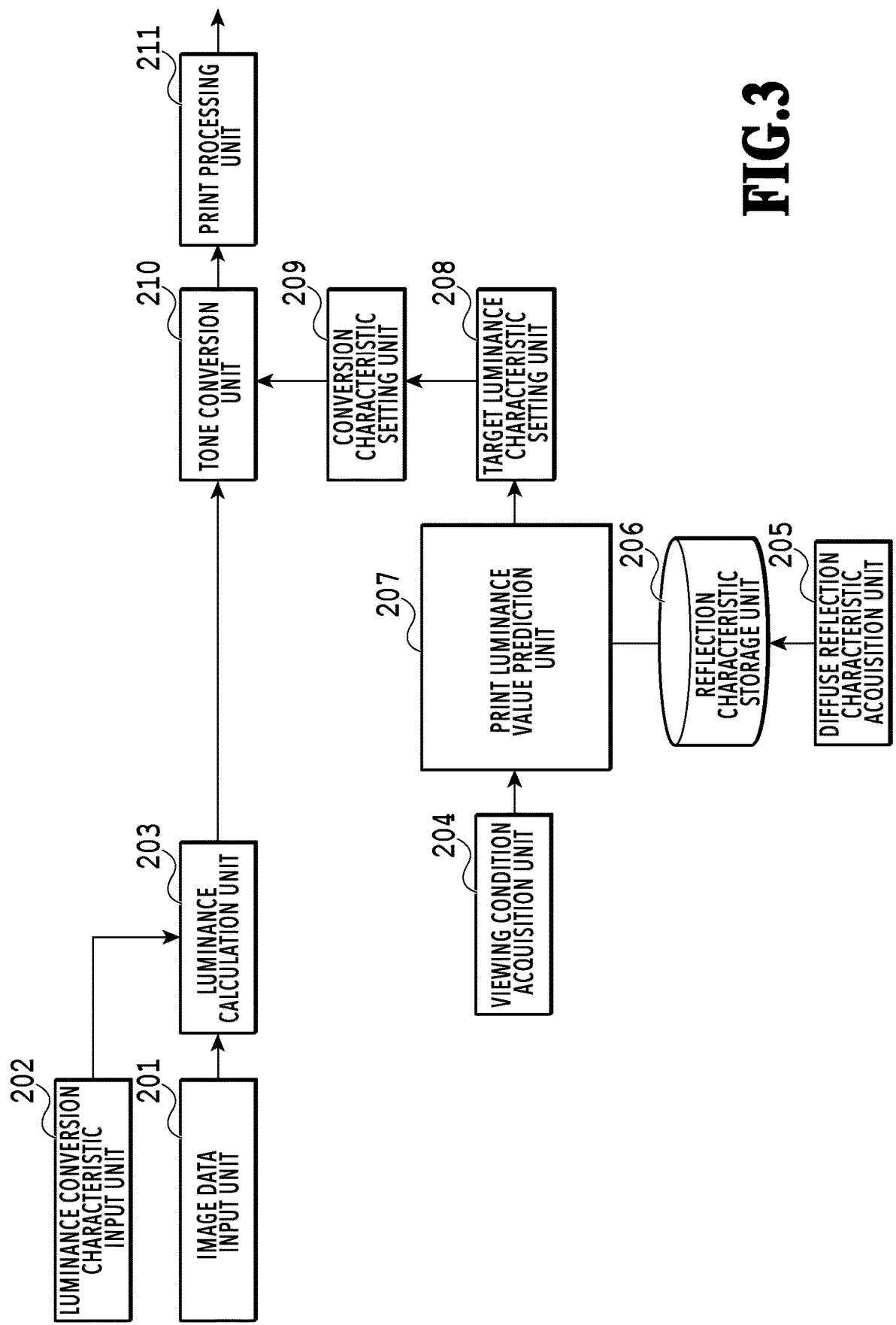
FIG. 3 is a function block diagram of the image processing apparatus.

Next, by using FIG. 3, the function configuration of the image processing apparatus 100 is explained. FIG. 3 is a function block diagram of the image processing apparatus 100. The functions shown in FIG. 3 are implemented by supplying programs for implementing these functions to the image processing apparatus 100 shown in FIG. 2 and further the image processing apparatus 100 executing the programs.

Upon receipt of the input of image data by instructions from a user, an image data input unit 201 stores the input image data in a predetermined buffer allocated to the RAM 106 and the like. A luminance conversion characteristic input unit 202 receives (acquires) a characteristic for converting the pixel values of the image data input by the image data input unit 201 into pixel values whose luminance is linear.

As the luminance conversion characteristic, it may also be possible to use a lookup table for converting input image data into image data (pixel values) whose luminance is linear. Further, in a case where the input image data has a publicly known $\gamma$ value for the luminance, it is sufficient to store a value obtained by performing inverse $\gamma$ conversion for the $\gamma$ value. For example, it is assumed that the image data input to the image data input unit 201 is an sRGB image. In that case, it is publicly known that $\gamma=0.45$ is applied to the luminance of the sRGB image, and therefore, it is sufficient to input $\gamma=2.2$, which is the inverse of $\gamma=0.45$, to the luminance conversion characteristic input unit 202 and cause the image processing apparatus 100 to store it. In either case, the image that is input to the image data input unit 201 is only required to be input image data whose correspondence relationship with the luminance value of an object is already known.

A luminance calculation unit 203 converts the image data input to the image data input unit 201 into image data (pixel values) whose luminance is linear by using the luminance conversion characteristic input to the luminance conversion characteristic input unit 202. Here, the image data that is input to the image data input unit 201 is only required to be image data whose correspondence relationship with the luminance value of an object is already known. Then, it is only required for the luminance calculation unit 203 to be capable of converting the input image data into the image data that can be regarded as being substantially linear with respect to the luminance value based on the correspondence relationship. In a case where it is possible to regard the image data input to the image data input unit 201 as being substantially linear with respect to the luminance value, the luminance conversion characteristic input unit 202 and the luminance calculation unit 203 are no loner the indispensable configurations (functions).

A viewing condition acquisition unit 204 acquires the viewing condition set by a user by using the GUI shown in FIG. 7, to be described later. A diffuse reflection characteristic acquisition unit 205 acquires the diffuse reflection characteristic of the image output by the image output apparatus 111 by, for example, a colorimeter or a variable angle measuring unit. A reflection characteristic storage unit 206 stores the diffuse reflection characteristic (printed material reflection characteristic) acquired by the diffuse reflection characteristic acquisition unit 205.

Figure 4:
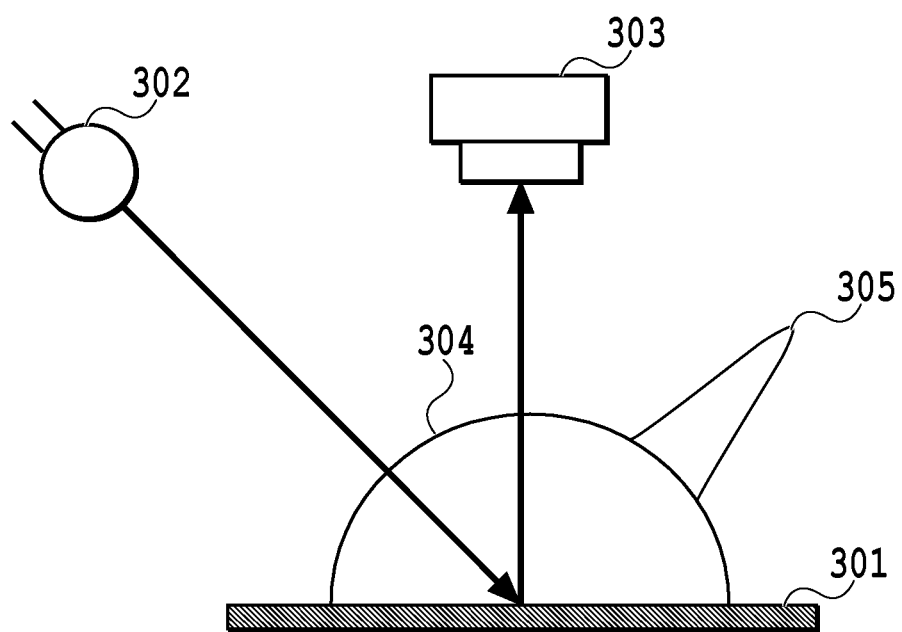
FIG. 4 is a diagram showing a spectrophotometer used in measurement of a diffuse reflection characteristic.

Here, by using FIG. 4, measurement of the diffuse reflection characteristic by a general spectral colorimeter is explained. In the measurement by a spectral colorimeter, as shown in FIG. 4, illumination light 302 is arranged in a direction of an incidence angle of 45 degrees with respect to a printed material 301. Then, the light irradiated from the illumination light 302 and reflected from the printed material 301 is received by a light receiving unit 303 arranged in a direction of a reflection angle of 0 degrees. By performing measurement as described above, in the light receiving unit 303 of the spectral colorimeter, specular reflected light 305 in accordance with the specular reflection characteristic of the printed material 301 is not measured and only diffuse-reflected light 304 from the printed material 301 is received (measured).

In the present embodiment, the diffuse reflection characteristic is acquired by printing an input RGB image (eight bits) whose luminance is linear on the printer side without performing tone conversion and measuring the light reflected from the printed (output) patches by the spectral colorimeter. The acquisition of the diffuse reflection characteristic is performed by printing an input image (white ((R, G, B)=(255, 255, 255)) to black ((R, G, B)=(0, 0, 0)) without performing tone conversion in a tone conversion unit 210 and using the printed patch. The acquired diffuse reflection characteristic is stored in the reflection characteristic storage unit 206 as the printed material reflection characteristic. Further, the reflection characteristic storage unit 206 is allocated to, for example, the storage unit 103 or the like.

In the present embodiment, the printed material reflection characteristic is acquired from each portion obtained by equally dividing the portion from the brightest portion (that is, the white patch formed from the image data whose luminance is the maximum) to the darkest portion (that is, the black patch formed from the image data whose luminance is the minimum) of the input image data into five portions. Specifically, the input RGB image whose luminance is linear is equally divided into five images on a gray line and the printed material reflection characteristic relating to each piece of image data is acquired without performing tone conversion in the tone conversion unit 210. That is, for the five patches of the input images whose luminance is linear (R, G, B)=(255, 255, 255), (192, 192, 192), (128, 128, 128), (64, 64, 64), and (0, 0, 0), the printed material reflection characteristic relating to each piece of image data is acquired.

The number of images (patches) from each of which the printed material reflection characteristic is acquired is not necessarily limited to this. Consequently, for example, it is also possible to acquire the printed material reflection characteristic for all the RGB values (256×256×256 sixteen millions), or for the RGB values (9×9×9=729) obtained by equally thinning the RGB values of 0 to 255 into nine RGB values.

Next, by using FIG. 5, the printed material reflection characteristic stored in the reflection characteristic storage unit 206 is explained. FIG. 5 is a diagram showing the printed material reflection characteristic that is stored in the reflection characteristic storage unit 206 and in more detail, showing an example in which the CIEXYZ values of the diffuse reflection characteristic corresponding to the input image whose luminance is linear are stored as a table.

It is also possible to use the CIELAB values or only the luminance value Y in place of the CIEXYZ values.

Returning to FIG. 3, a print luminance value prediction unit 207 calculates (predicts) the luminance of the diffuse-reflected light of the printed material in the viewing environment from the illumination intensity acquired from the viewing condition acquisition unit 204 and the printed material reflection characteristic stored in the reflection characteristic storage unit 206. A target luminance characteristic setting unit 208 sets a target luminance characteristic to be reproduced as a printed material based on the print luminance predicted by the print luminance value prediction unit 207. As will be described later, in a case where saturation is used in place of luminance, the target luminance characteristic setting unit 208 sets a target saturation characteristic to be reproduced as a printed material as a target saturation characteristic setting unit.

A conversion characteristic setting unit 209 sets a tone conversion characteristic for conversion into image data to be output to the print processing unit 211 based on the difference between the target luminance characteristic set by the target luminance characteristic setting unit 208 and the print luminance predicted by the print luminance value prediction unit 207.

The tone conversion unit 210 performs tone conversion for the input image data whose luminance is linear, which is output from the luminance calculation unit 203, by using the tone conversion characteristic set by the conversion characteristic setting unit 209.

A print processing unit 211 outputs print image data after performing processing for print (for printing) for the image data (output image data) converted by the tone conversion unit 210. In the present embodiment, it is assumed that the pixel value of the above-described print image data and the luminance of the printed material are in a liner (proportional) relationship. Further, the print image data is supplied to the image output apparatus 111 via the output unit 108 and image forming processing is performed.

(Print Processing Unit)

Figure 6:
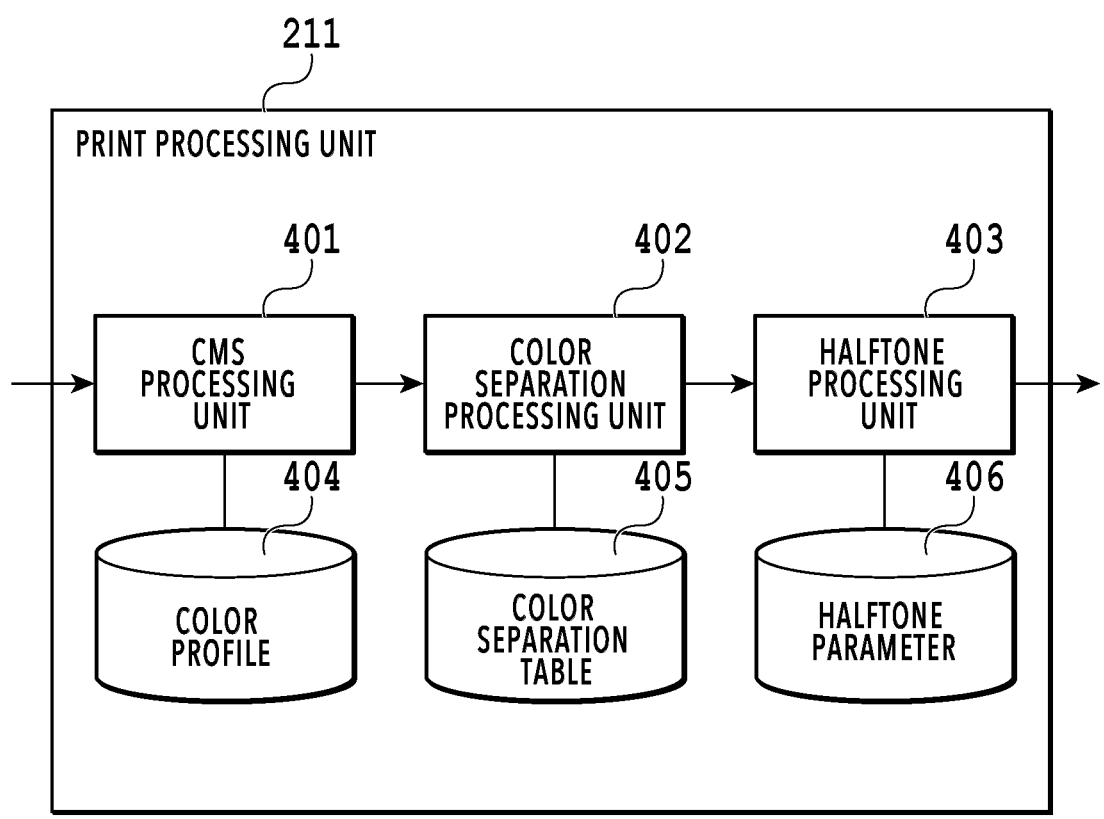
FIG. 6 is a function block diagram of a print processing unit.

Next, by using FIG. 6, the function configuration of the print processing unit 211 is explained. FIG. 6 is a function block diagram of the print processing unit 211. The print processing unit 211 comprises, as its functions, a CMS processing unit 401, a color separation processing unit 402, a halftone processing unit 403, a color profile 404, a color separation table 405, and a halftone parameter 406.

The CMS (Color Management System) processing unit 401 performs color matching processing for image data stored in the buffer by referring to the color profile 404 designed in advance.

The color separation processing unit 402 performs color separation for the image data for which the color matching processing has been performed into printing materials mounted on the image output apparatus 111 by referring to the color separation table 405 designed in advance. For example, in a case where printing materials of six colors of CMYKLcLm are mounted on the image output apparatus 111, the color separation is performed for the RGB image data into printing material data indicating the amount of each printing material of CMYKLcLm.

The halftone processing unit 403 binarizes each piece of printing material data for which the color separation has been performed by binarization processing, such as the error diffusion method and the dither method, by referring to an error diffusion coefficient, such as the halftone parameters 406, and a threshold value matrix. In a case where the image output apparatus 111 is an ink jet printer, the image output apparatus 111 forms, upon receipt of halftone image data, an image on a printing medium by controlling ejection of corresponding ink in accordance with each piece of printing material data.

(Viewing Condition Acquisition Unit)

Figure 7:
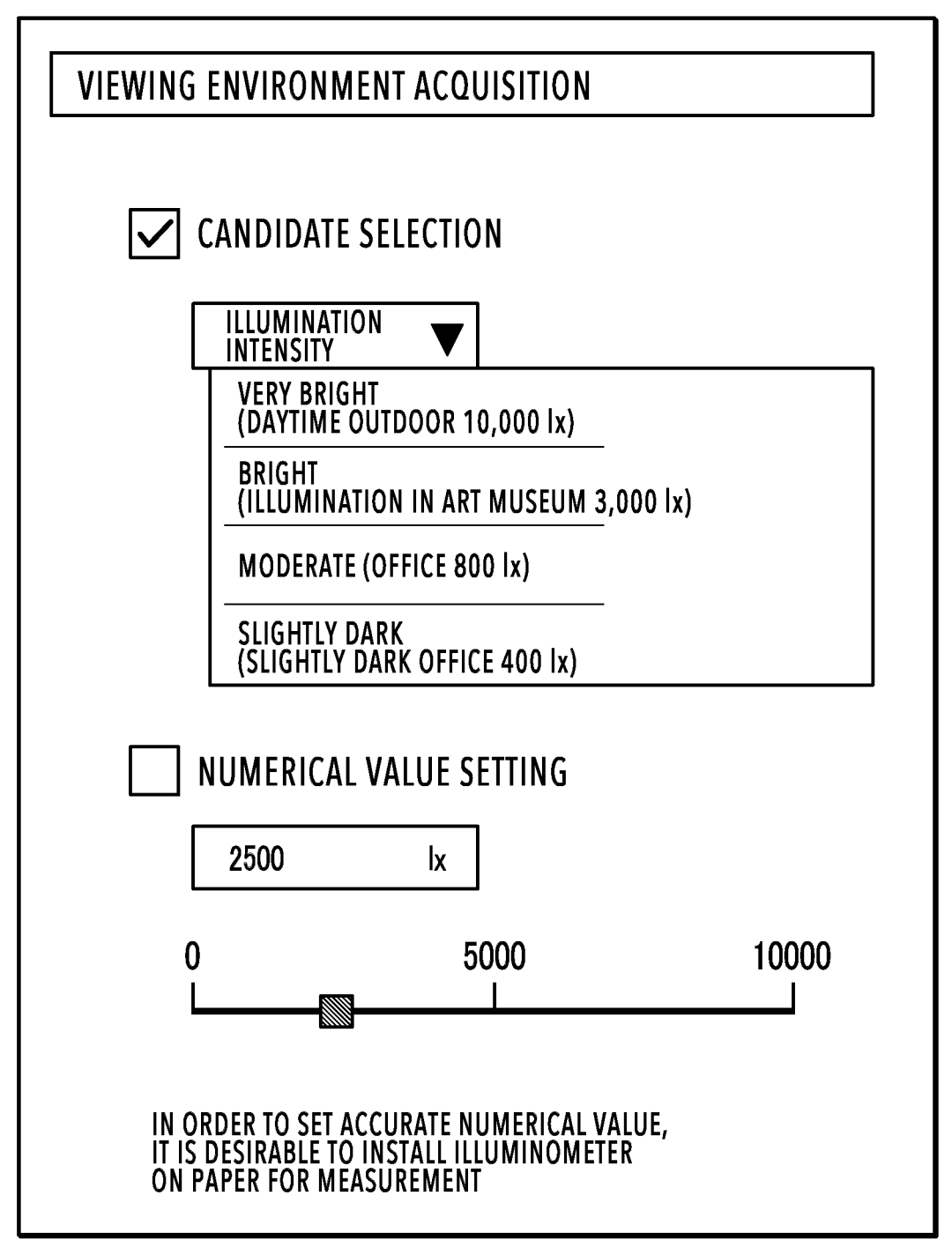

Next, by using FIG. 7, the GUI provided by the viewing condition acquisition unit 204 is explained. A user sets the viewing condition by using the GUI shown in FIG. 7. A user selects "Candidate selection" in which the illumination intensity on a printed material is input intuitively and "Numerical value setting" in which the illumination intensity is input with a numerical value (physical value) by checking a checkbox on the GUI shown in FIG. 7.

In a case where "Candidate selection" is selected, the illumination intensity is selected from candidates, for example, such as very bright (daytime outdoor), bright (illumination in art museum), moderate (office), and slightly dark (slightly dark office (ordinary home)). To the candidate that is selected as "Candidate selection", an illuminance lux corresponding to the candidate is set and for example, in a case where moderate (office) is selected, the subsequent processing is performed on the assumption that 800 [lx] is selected. Further, in a case where "Numerical value setting" is selected, a specific illumination intensity is selected by an illumination intensity (value of illuminance lux [lx]) on the printed material being input in a text box or by moving a slider bar to the left or right. By the above, the illumination intensity with which the surface of the printed material is irradiated is acquired and set by the viewing condition acquisition unit 204.

In the above-described embodiment, although explanation is given by using the illuminance [lx] as the illumination intensity (luminance), the illumination intensity is not necessarily limited to this and for example, it is also possible to use luminance [cd/m$^2$] and [nit]. In addition, in order to cause the illumination intensity to be input more accurately, it may also be possible to display a note to the effect that the illuminance measurement by an illuminometer is necessary on the printed material that is posted on the GUI.

(Image Processing)

Figure 8:
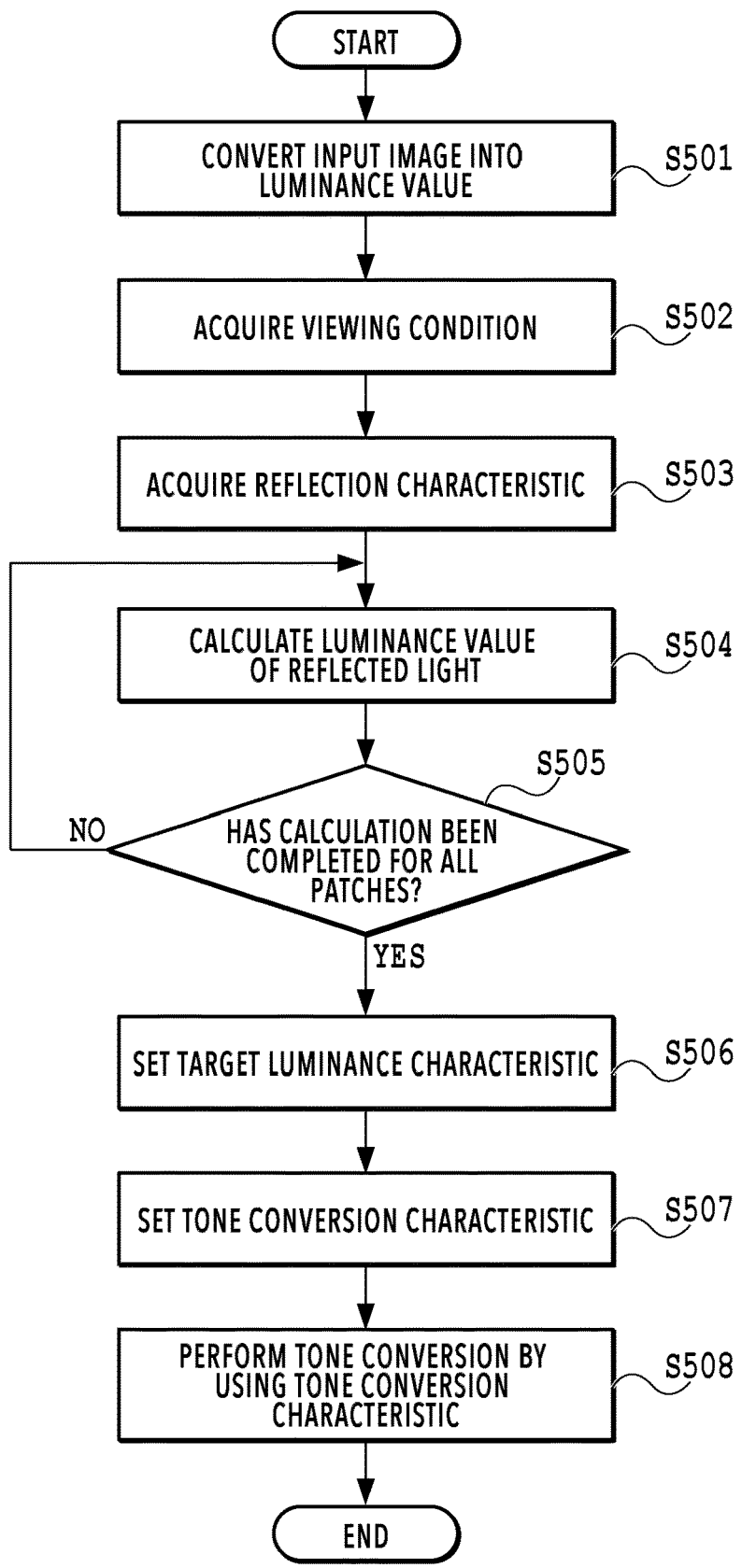
FIG. 8 is a flowchart showing a procedure of image processing in an image processing apparatus.

Next, by using FIG. 8, the image processing in the image processing apparatus 100 is explained. FIG. 8 is a flowchart showing the procedure of the image processing in the image processing apparatus 100. Each symbol S in the following means that the step is a step in the flowchart. The luminance calculation unit 203 converts the image data input to the image data input unit 201 into input image data whose luminance is linear by using the luminance conversion characteristic input to the luminance conversion characteristic input unit 202 (S501).

The viewing condition acquisition unit 204 acquires a viewing condition (illumination intensity Lt [lx]) selected by a user (S502)

In a case where the viewing condition is acquired by the viewing condition acquisition unit 204 (S502), the print luminance value prediction unit 207 acquires a diffuse reflection characteristic (Pd) from the reflection characteristic storage unit 206 (S503). The print luminance value prediction unit 207 calculates a luminance Cd of the diffuse-reflected light of the printed material based on the viewing condition (illumination intensity Lt [lx]) and the diffuse reflection characteristic (Pd), which are acquired (S504).

The luminance Cd of the diffuse-reflected light of the printed material is calculated by the following formula.

$$Cd = PdY/100 \times Lt/\pi [cd/m^2] \qquad (1)$$

Here, π indicates the ratio of the circumference of a circle to its diameter and PdY indicates the Y component in the tri-stimulus values XYZ of the diffuse reflection characteristic.

The print luminance value prediction unit 207 determines whether or not the luminance Cd of the diffuse-reflected light has been calculated for all the patches (S505). Then, in a case where it is determined that the calculation of the luminance Cd of the diffuse-reflected light has not been completed for all the patches (No at S505), the image processing apparatus 100 returns the processing to S504 and calculates the luminance Cd of the diffuse-reflected light for all the patches.

As described above, in the present embodiment, for the input RGB image (whose luminance is linear) obtained by equally dividing the gray line into five portions, the diffuse reflection characteristic relating to each piece of image data is acquired. That is, for the input image whose luminance is linear (R, G, B)=(255, 255, 255), (192, 192, 192), (128, 128, 128), (64, 64, 64), and (0, 0, 0), the printed material reflection characteristic relating to each piece of image data is acquired.

In a case where the luminance Cd of the diffuse-reflected light of the printed material is calculated by the print luminance value prediction unit 207, the target luminance characteristic setting unit 208 sets (derives) a target luminance characteristic to be reproduced as the printed material based on the calculated luminance Cd of the diffuse-reflected light of the printed material (S506).

The target luminance characteristic is set so that in a case where the reproduction range of the print luminance characteristic is different, the slope in the linear area of the output luminance on a condition that the reproduction range is relatively small and the slope in the linear area of the output luminance on a condition that the reproduction range is relatively large become the same.

In the following, in a case where the reproduction range of the print luminance characteristic is considered as the difference between the maximum value of the print luminance and the minimum value of the print luminance, as the illumination intensity [lx] becomes high, generally, the reproduction range of the print luminance characteristic becomes large.

Here, for example, as shown in FIG. 5, it is supposed that the printed material having the range in which the diffuse reflection characteristic PdY of print is 0.77 to 90.3 is irradiated with an illumination whose illumination intensities [lx] are, for example, 300 and 3,000, which are ten times different, as the illumination intensity [lx]. Then, the reproduction range of the print luminance characteristic is calculated by formula (1).

In a case where the illumination intensity is 300 [lx], the print luminance characteristic Cd is 0.7 to 86.3 [cd/m$^2$] and (the maximum value of the print luminance—the minimum value of the print luminance) is 85.6. On the other hand, in a case where the illumination intensity is 3,000 [lx], the print luminance characteristic Cd is 7.4 to 862 [cd/m$^2$] and (the maximum value of the print luminance—the minimum value of the print luminance) is 855. That is, the higher the illuminance intensity [lx] becomes, the larger the reproduction range of the print luminance characteristic becomes.

It is also possible to approximately calculate the reproduction range of the print luminance characteristic from the maximum value of the print luminance. The reason the calculation is possible in this manner is that the minimum value of the print luminance is sufficiently smaller than the maximum value of the print luminance and even in a case where the reproduction range of the print luminance characteristic is calculated by using the maximum value of the print luminance, the same value is obtained in many cases.

In addition, in view of the above-described contents, in a case where the reproduction range of the print luminance characteristic is different, the setting is performed so that the slope in the linear area of the output luminance in a case where the reproduction range is relatively small and the slope in the linear area of the output luminance in a case where the reproduction range is relatively large become the same.

Figure 9:
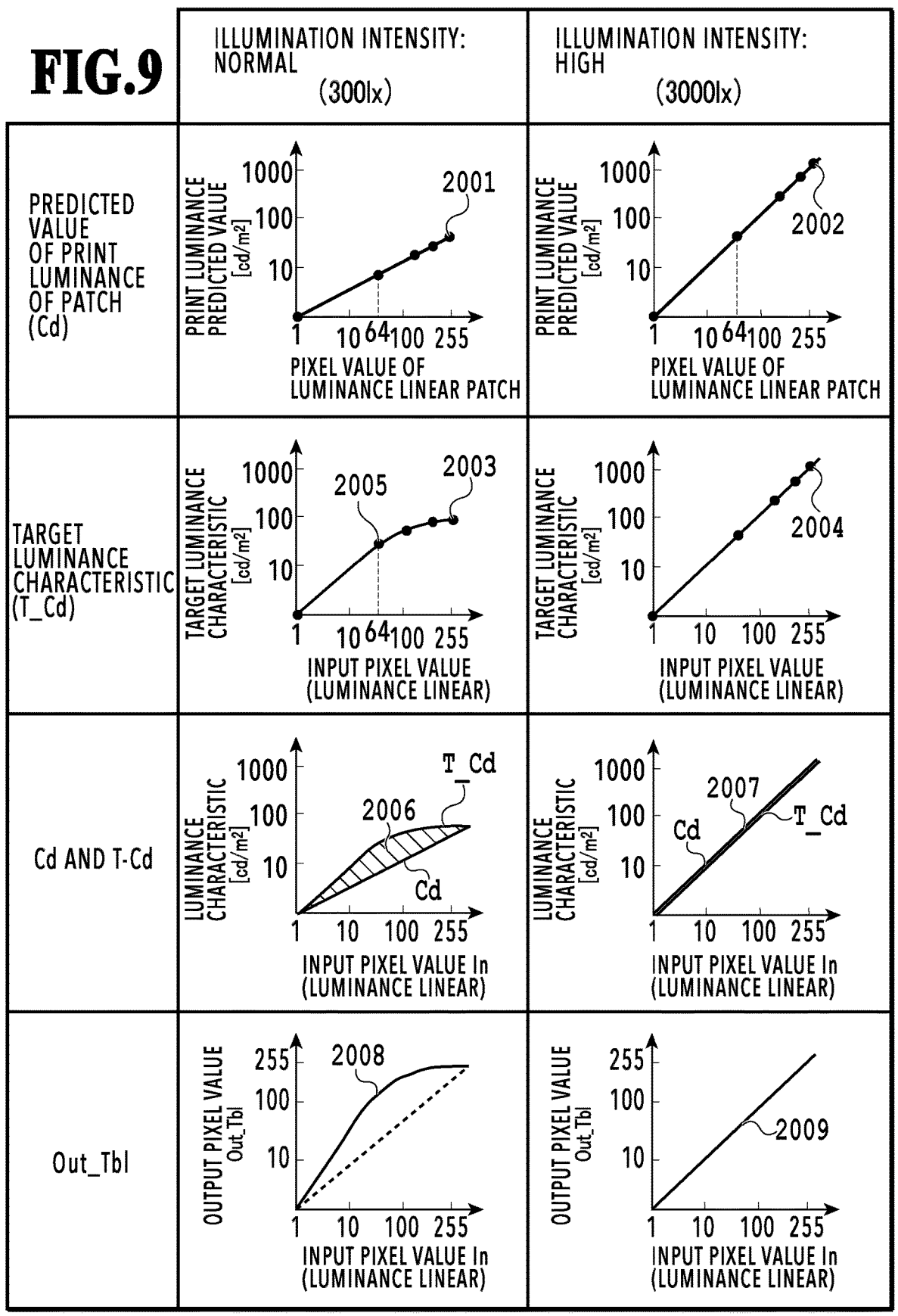
FIG. 9 is a diagram showing a target luminance characteristic and a conversion characteristic.

Next, by using FIG. 9, the setting of the target luminance characteristic is explained. FIG. 9 shows s print luminance predicted value Cd of a patch, which is predicted in accordance with the illumination intensity, and a target luminance characteristic T_Cd that is set based on the print luminance predicted value.

In FIG. 9, the print luminance predicted value Cd is calculated based on formula (1) from a Y-value (PdY) of the diffuse reflection characteristic and the illumination intensity Lt [lx]. Based on formula (1), in FIG. 9, in a case where the illumination intensity is normal (300 [lx]), a maximum value Cd_Max (2001) of the print luminance predicted value Cd of a patch is about 100 [cd/m$^2$]. On the other hand, in a case where the illumination intensity is high (3,000 [lx]), the maximum value Cd_Max (2002) of the print luminance predicted value Cd of a patch is about 1,000 [cd/m$^2$].

The illuminating apparatus device that is used in a case where the illumination intensity is normal (300 [lx]) as described above is a handy-type, simple illumination. On the other hand, the illuminating apparatus that is used in a case where the illumination intensity is high (3,000 [lx]) is a comparatively large illumination.

The target luminance characteristic T_Cd in a case where the illumination intensity is normal (300 [lx]) has a linear characteristic in the portion from the shadow portion to the halftone portion (area in which the input pixel value is smaller than 64 (2005)). In the portion from the halftone portion to the highlight portion (area in which the input pixel value is greater than 64 (2005)), the conversion characteristic bends and the target luminance characteristic T_Cd has a nonlinear characteristic (2003). On the other hand, the target luminance characteristic T_Cd in a case where the illumination intensity is high (3,000 [lx]) has a linear characteristic in the portion from the shadow portion to the highlight portion (2004).

As described above, in a case where the reproduction range of the print luminance characteristic is different, the setting is performed so that the slope in the linear area of the output luminance in a case where the reproduction range is relatively small and the slope in the linear area of the output luminance in a case where the reproduction range is relatively large become the same.

In addition, in the example described above, although the example is shown in which in a case where the illumination intensity is high (3,000 [lx]), the target luminance characteristic has a linear characteristic in the portion from the shadow portion to the highlight portion, the target luminance characteristic is not necessarily limited to this. Consequently, it may also be possible to cause the target luminance characteristic to have a linear characteristic in the portion from the shadow portion to the highlight portion in a case where the illumination intensity is lower than the 3,000 [lx] (for example, 1,000 [lx]). Further, on the contrary, it may also be possible to cause the target luminance characteristic to have a nonlinear characteristic in the highlight portion (that is, area in which the input pixel value is greater than 128) in a case where the illumination intensity is higher than 3,000 [lx] (for example, 5,000 [lx]). In either case, it is only required for the setting to be performed so that in a case where the reproduction range of the print luminance characteristic is different, the slope in the linear area of the target luminance characteristic in a case where the reproduction range is relatively small and the slope in the linear area of the target luminance characteristic in a case where the reproduction range is relatively large become the same.

As a supplement, it is possible to determine the distinction between the linear area and the nonlinear area by a change in the feature amount, such as the difference between the pixel value and the previous (or next) pixel value (differential). For example, a difference of the target luminance characteristic between the pixel value and the previous (or next) pixel value is sequentially calculated in order from the shadow portion (pixel value 0). Then, in a case where the difference between the pixel value and the previous (or next) pixel value is constant, the area is regarded as being linear. Further, in a case where a difference value ΔT is greater than a predetermined amount, or less than a predetermined amount, the area is regarded as being nonlinear. Consequently, for example, in distinguishing between the linear area and the nonlinear area, in a case where the change ΔT in the difference value is equal to or greater than 3, or the change ΔT in the difference value is equal to or less than ⅓, it is determined that the area is the nonlinear area.

Figure 10:
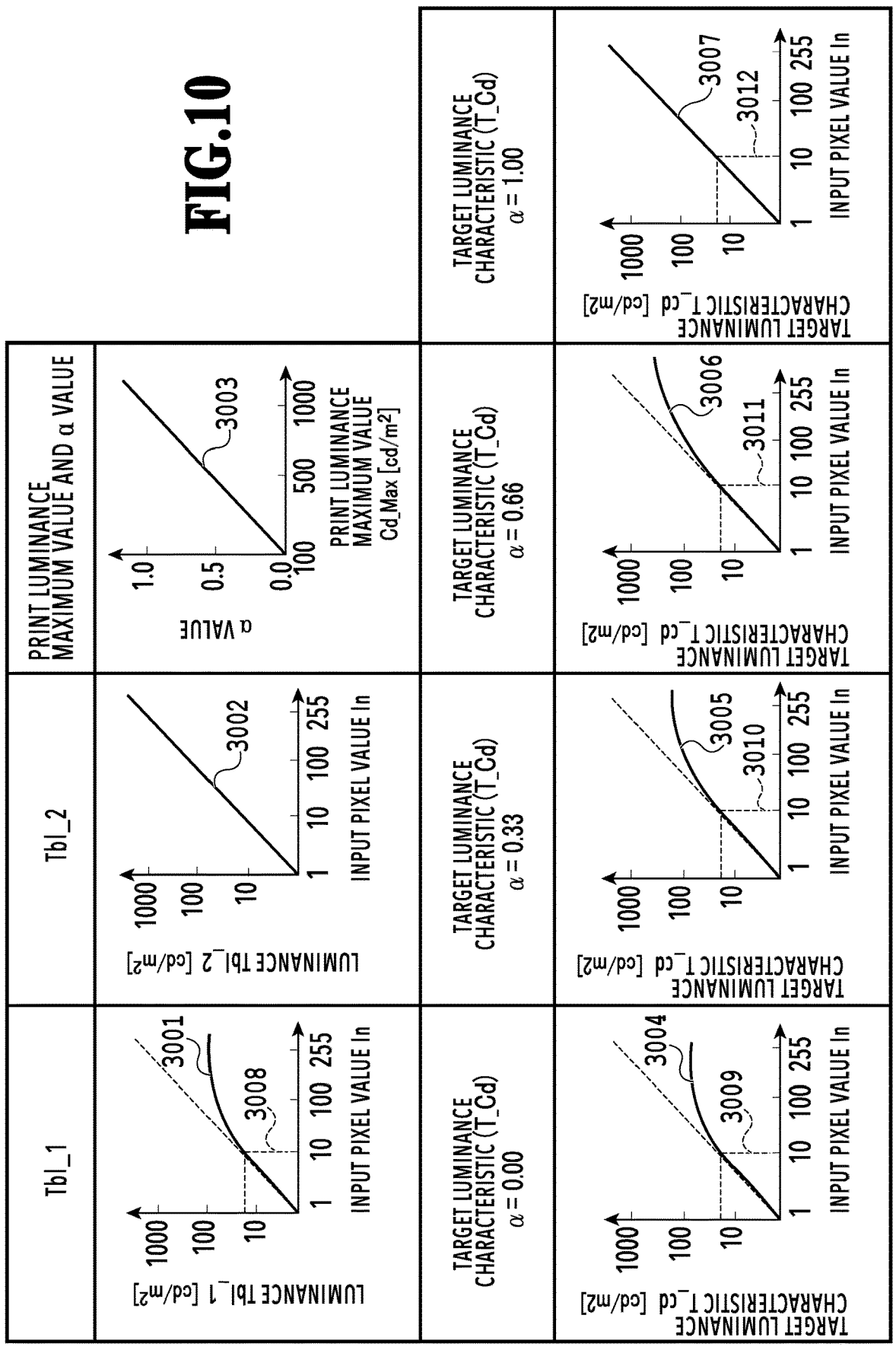
FIG. 10 is a diagram showing a setting method of the target luminance characteristic in a target luminance characteristic setting unit.

Next, by using FIG. 10, the setting method of the target luminance characteristic T_Cd in the target luminance characteristic setting unit 208 is explained. The target luminance characteristic T_Cd that is set by the target luminance characteristic setting unit 208 is calculated from two different tables (Tbl_1, Tbl_2) prepared in advance and a function of a weighting a value in accordance with the maximum value Cd_Max [cd/m$^2$] of the print luminance predicted value Cd.

The two different tables are Tbl_1 (3001) having nonlinearity (ΔT is equal to or greater than 3 or equal to or less than ⅓) and Tbl_2 (3002) having linearity in the portion from the shadow portion to the highlight portion and the tables are set to that the slopes in the linear areas of the output luminance become the same. Further, as the function, a function in which the weighting a value in accordance with the maximum value Cd_Max [cd/m$^2$] of the print luminance predicted value Cd is in a linear relationship with Cd_Max (3003) is used. That is, the functions are set so that as the maximum value Cd_Max of the print luminance predicted value Cd becomes greater, the weighting a value also becomes greater.

Based on the premise described above, the target luminance characteristic T_Cd in the target luminance characteristic setting unit 208 is calculated by the following formula.

$$T\_Cd(In)=(1-\alpha(Cd\_\text{Max}))\times Tbl\_1(In)+\alpha(Cd\_\text{Max})\times Tbl\_2(In) \quad (2)$$

In is the input pixel vale (0≤In≤255). Further, Tbl_1 (In) is the luminance value of Tbl_1 in the input pixel value In and Tbl_2 (In) is the luminance value of Tbl_2 in the input pixel value In. Then, the target luminance characteristic T_Cd calculated by the above formula in a case where the weighting α value is varied as α=0.00 (3004), α=0.33 (3005), α=0.66 (3006), and α=1.00 (3007) is shown on the lower side in FIG. 10.

As shown in FIG. 10, even in a case where the a value is varied (even in a case where the reproduction range of the print luminance is varied), in the area in which the input pixel value In and the target luminance characteristic T_Cd have a linear relationship, it is known that the slopes are the same. That is, in a case where the reproduction range of the print luminance characteristic is different, the setting is performed so that the slope in the linear area of the output luminance in a case where the reproduction range is relatively small and the slope in the linear area of the output luminance in a case where the reproduction range is relatively large become the same.

In FIG. 10, the example is shown in which the target luminance characteristic T_Cd is set so that the slopes in the linear areas of the output luminance become the same even in a case where the reproduction range of the print luminance characteristic is different by using the two different tables. Note that the setting of the target luminance characteristic T_Cd is not necessarily limited to the method described above and for example, it may also be possible to define the target luminance characteristic T_Cd by a spline function and set the curve of the spline function so that the slopes in the linear areas of the output luminance become the same.

Here, returning to FIG. 8, the conversion characteristic setting unit 209 sets a conversion characteristic Out_Tbl by using the print luminance predicted value Cd of a patch, which is predicted by the print luminance value prediction unit 207, and the target luminance characteristic T_Cd set by the target luminance characteristic setting unit 208 (S507). The conversion characteristic Out_Tbl is set so that the print luminance predicted value Cd becomes the target luminance characteristic T_Cd.

Here, FIG. 9 is referred to again and the print luminance predicted value Cd and the target luminance characteristic T_Cd are compared. In FIG. 9, a graph that compares tendencies of the print luminance predicted value Cd and the target luminance characteristic T_Cd in a case where the illumination intensity is normal (300 [lx]) is indicated by 2006. Further, a graph that compares tendencies of the print luminance predicted value Cd and the target luminance characteristic T_Cd in a case where the illumination intensity is high (3,000 [lx]) is indicated by 2007.

As indicated by symbol 2006 and symbol 2007 in FIG. 9, in a case where the illumination intensity is normal (300 [lx]), it is known that the target luminance characteristic T_Cd becomes larger than the print luminance predicted value Cd. On the other hand, in a case where the illumination intensity is high (3,000 [lx]), it is known that the print luminance predicted value Cd and the target luminance characteristic T_Cd substantially overlap. That is, in a case where the illumination intensity is high (3,000 [lx]), the target luminance characteristic T_Cd and the print luminance predicted value Cd are substantially the same.

Here, as expressed in the above formula (1), the print luminance predicted value Cd is in a proportional relationship with the illumination intensity Lt [lx] (that is, in a case where the illumination intensity Lt is halved, the print luminance predicted value Cd is also halved and in a case where the illumination intensity Lt [lx] is doubled, the print luminance predicted value Cd is also doubled).

Consequently, in a case where the conversion characteristic Out_Tbl is set based on the ratio of the print luminance predicted value Cd to the target luminance characteristic T_Cd for each tone in the graphs 2006 and 2007, it is possible to put the print luminance value close to the target luminance characteristic in all the tones.

Because of this, the conversion characteristic Out_Tbl is set by the following formula. In is the input pixel value (0≤In≤255), T_Cd (In) is the target luminance characteristic in the input pixel value In, and Cd (In) is the print luminance predicted value in the input pixel value In.

$$Out\_Tbl(In)=(T\_Cd(In)/Cd(In))\times 255 \quad (3)$$

The conversion characteristic Out_Tbl in a case where the illumination intensity is normal (300 [lx]) is indicated by 2008 in FIG. 9 and the conversion characteristic Out_Tbl in a case where the illumination intensity is high (3,000 [lx]) is indicated by 2009 in FIG. 9. As shown in FIG. 9, in a case where the illumination intensity is normal (300 [lx]) and in a case where the illumination intensity is high (3,000 [lx]), the setting is performed so that the slopes in the linear areas of the output luminance become the same.

That is, in a case where the reproduction range of the predicted print luminance characteristic is different, the setting is performed so that the slope in the linear area of the output luminance in a case where the reproduction range is relatively small and the slope in the linear area of the output luminance in a case where the reproduction range is relatively large become the same.

Here, returning to FIG. 8, the tone conversion unit 210 performs tone conversion for the image data calculated by the luminance calculation unit 203 by using the conversion characteristic Out_Tbl set by the conversion characteristic setting unit 209 and outputs the data to the print processing unit 211 (S508). Due to this, the image processing shown in FIG. 8 is terminated (S508).

As explained above, in the present embodiment, the print luminance perceived by a viewer is predicted by using the viewing condition and the print diffuse reflection characteristic measured in advance. In addition, it is described that in a case where the reproduction range of the predicted print luminance characteristic is different, the image data for the print control of the image output apparatus is changed so that the slopes in the linear areas of the output luminance become the same. That is, it is described that an image in which a visual change depending on the viewing environment is suppressed is generated.

Further, in the embodiment described above, based on the predicted print luminance characteristic, the luminance conversion characteristic is set so that the slopes in the linear areas of the output luminance become the same. Note that it may also be possible to predict the print saturation from tri-stimulus values PdX, PdY, and PdZ of the diffuse reflection characteristic shown in FIG. 5. Then, in a case where the reproduction range of the predicted print saturation characteristic is different, it may also be possible to set the conversion characteristic so that the slopes in the linear areas of the output saturation become the same.

Second Embodiment

In the first embodiment described above, in a case where the reproduction range of the predicted print luminance characteristic is different, the luminance conversion characteristic is set so that the slopes in the linear areas of the output luminance become the same. Further, the conversion characteristic is set so that the print luminance predicted value Cd becomes the target luminance characteristic T_Cd (FIG. 10) calculated based on the synthesis (formula (2)) of the two different tables.

Note that, in the target luminance characteristic set by the method described above, the area in which the output luminance characteristic becomes the curve from the straight line (area in which nonlinearity begins) is the same even in a case where the reproduction range of the print luminance characteristic is different. Specifically, for example, the output luminance characteristic of Tbl_1 (3001) shown in FIG. 10 becomes the curve from the straight line in the vicinity of 10 of the input image value In and in the vicinity (3008) of 20 [cd/m2] of the output luminance Tbl_1. Further, the area in which the output luminance characteristic becomes the curve from the straight line is also the same even in a case where the reproduction range of the print luminance characteristic is different (3008 to 3012). That is, the linear area of the output luminance characteristic is the same.

Note that, in a case where the reproduction range of the print luminance characteristic is different, the linear area of the output luminance characteristic does not need to be the same. Rather, it must be possible to represent the output luminance information corresponding to the input information more correctly by increasing the linear area of the output luminance characteristic as the reproduction range of the print luminance becomes large.

Consequently, in the present embodiment, in a case where the reproduction range of the print luminance characteristic is different, on a condition that the reproduction range becomes relatively large, the conversion characteristic of the output luminance is set so that the linear area of the output luminance becomes large. The present embodiment is the same as the first embodiment except for the processing at S506 of the flowchart shown in FIG. 8, and therefore, here, explanation thereof is omitted.

In the first embodiment, at S506, based on the luminance Cd of the diffuse-reflected light of the printed material, which is calculated by the print luminance value prediction unit 207, the target luminance characteristic to be reproduced as the printed material is set. In the present embodiment, the two or more target luminance characteristics T_Cd whose sizes of the linear areas of the output luminance are different are prepared and switched in accordance with the maximum value Cd_Max of the print luminance predicted value Cd. Specifically, for example, as shown in FIG. 11, the four target luminance characteristics T_Cd whose sizes of the linear areas of the output luminance are different are prepared and the target luminance characteristics T_Cd are switched in correspondence to the maximum value Cd_Max of the print luminance predicted value Cd.

Figure 11:
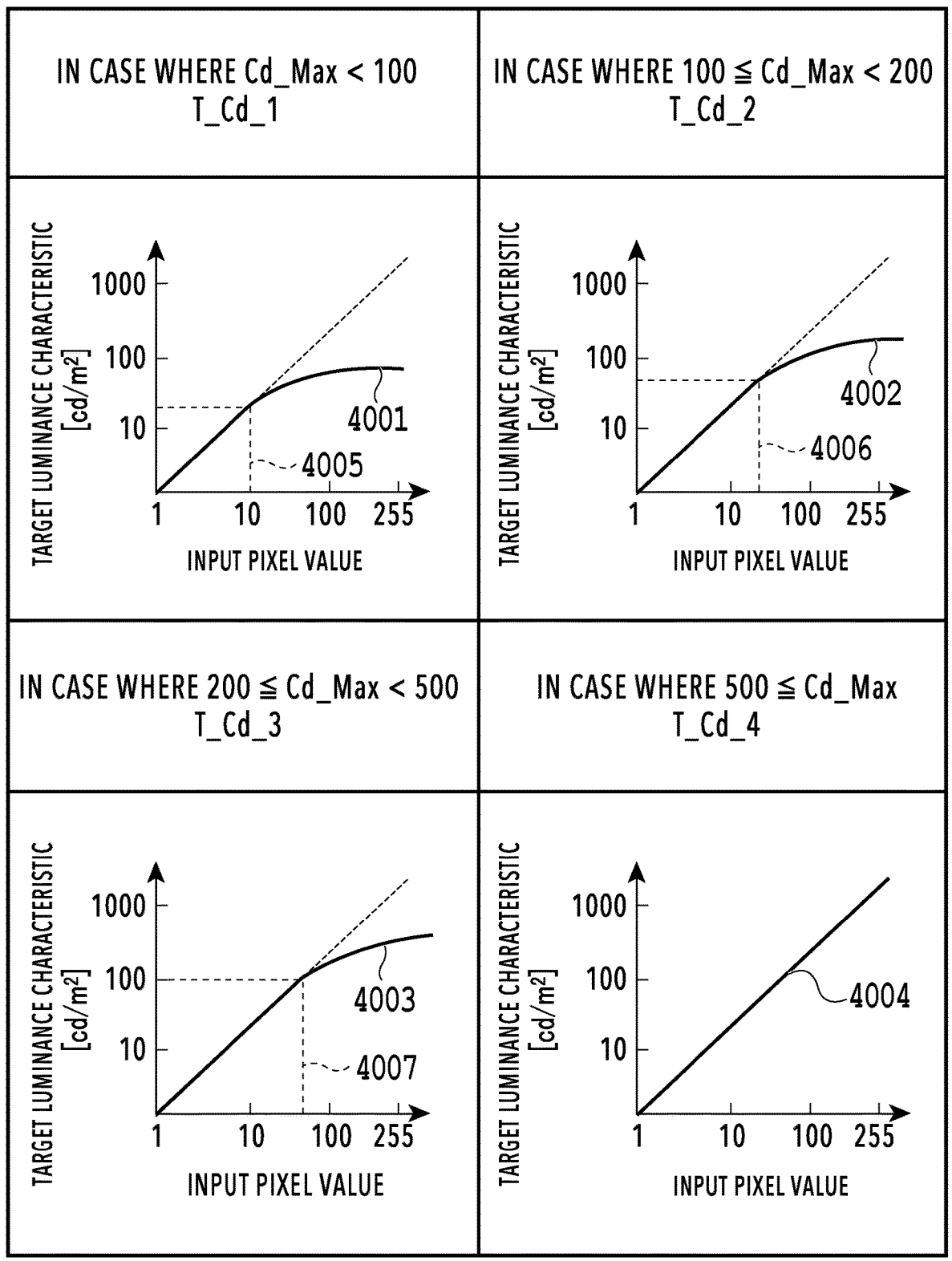
FIG. 11 is a diagram showing the target luminance characteristic corresponding to a print luminance maximum value.

FIG. 11 shows the target luminance characteristic T_Cd corresponding to the print luminance maximum value and in FIG. 11, for example, in a case where the print luminance maximum value satisfies "Cd_Max<100", T_Cd_1 (4001) is allocated as the target luminance characteristic. Similarly, in a case where "100≤Cd_Max<200", T_Cd_2 (4002) is allocated, in a case where "200≤Cd_Max<500", T_Cd_3 (4003) is allocated, and in a case where "500≤Cd_Max", T_Cd_4 (4004) is allocated In FIG. 11, as will be known from 4005 to 4007 in the drawing, the target luminance characteristic T_Cd is set so that the larger the reproduction range of the print luminance characteristic, the larger the linear area of the output luminance becomes.

In FIG. 11, based on the predicted print luminance characteristic, the luminance conversion characteristic is set so that the linear area of the output luminance becomes large. Note that it may also be possible to set the saturation conversion characteristic so that the linear area of the output saturation becomes large based on the predicted print saturation characteristic.

As explained above, in the present embodiment, in a case where the reproduction range of the print luminance characteristic is different, on a condition that the reproduction range becomes large relatively, the conversion characteristic of the output luminance is set so that the linear area of the output luminance becomes large. Due to this, even in a case where the reproduction range of the print luminance is different, it is possible to represent the output luminance information corresponding to the input information more correctly.

Third Embodiment

In the first and second embodiments described above, the print luminance (saturation) is predicted from the illumination intensity. Then, the example is shown in which the setting is performed so that "the slopes in the linear areas of the output luminance become the same" in accordance with the reproduction range of the predicted print luminance (saturation). Further, the example is also shown in which the setting is performed so that "the linear area corresponding to the luminance (saturation) of the input image increases".

Figure 12:
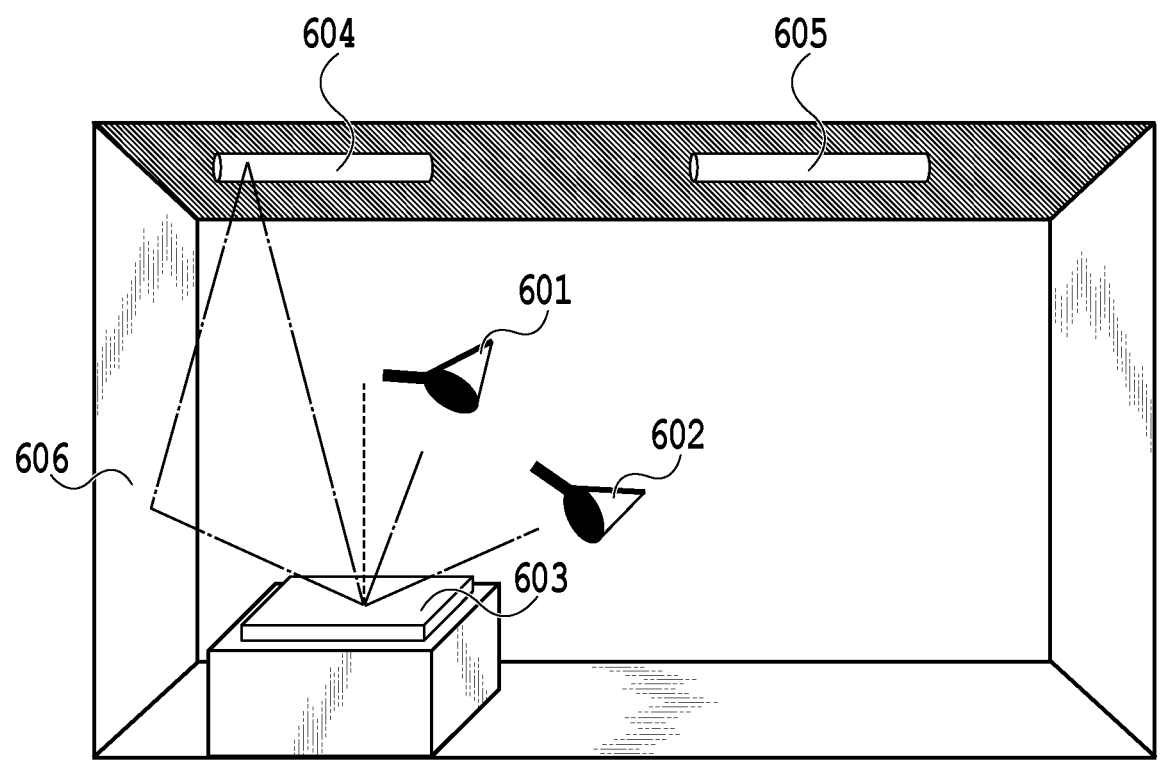
FIG. 12 is a diagram explaining reflected light received by the eye of a viewer from a printed material arranged in a general viewing environment.

Note that there is a case where it is not possible to predict the print luminance only by the illumination intensity. In the following, the case where it is not possible to predict the print luminance only by the illumination intensity is illustrated by using FIG. 12. FIG. 12 is a diagram showing the way light reflected from a printed material arranged in a general viewing environment is received by the eyes of a viewer.

In FIG. 12, a viewing position 601 corresponds to the specular reflection direction of an illumination 604 and at the viewing position 601, the light (specular reflected light) included in the illumination image of a printed material 603 reaches the eyes of a viewer. Here, in a case where the intensity of the specular reflected light is too high, it is not possible for a viewer to recognize the color of the printed material 603, and therefore, the viewer moves from the viewing position 601 to a viewing position 602 at which the specular reflected light does not enter the eyes and views the printed material 603.

Note that, in a case where FIG. 12 is referred to, in the specular reflection direction corresponding to the positional relationship between the viewing position 602 and the printed material 603, a wall 606 exists. That is, in the specular reflection direction corresponding to the positional relationship between the viewing position 602 and the printed material 603, the wall 606 exists. Because of this, the light of the illumination 604 is reflected from the wall 606 and reaches the printed material 603 and further, received by the eyes of the viewer as the specular reflected light in accordance with the specular refection characteristic of the printed material 603 and recognized as the print luminance by the viewer.

Although the reflected light from the wall 606 is weak compared to the light that reaches the printed material 603 directly from the illumination 604, the intensity thereof is not so low that the color of the printed material 603 cannot be recognized at the viewing position 602. In addition, in a case where the light from a variety of directions other than the specular reflection direction, for example, the light from an illumination 605 also reaches the printed material 603, the light is also received by the eyes of the viewer as the diffuse-reflected light in accordance with the diffuse reflection characteristic of the printed material 603 and recognized as the print luminance.

As described above, the eyes of the viewer receive the print luminance, which is the luminance in the incidence angle direction facing the positional relationship between the viewing angle and the printed material being reflected in accordance with the specular reflection characteristic, and the print luminance, which is the light from a direction other than the incidence angle direction being reflected in accordance with the diffuse reflection characteristic of the printed material 603. That is, the eyes of the viewer receive the print luminance based on the diffuse reflection and the print luminance based on the specular reflection.

Here, in the first embodiment described above, only the print luminance based on the diffuse reflection of the light (illumination intensity) in the direction other than the incidence angle direction facing the positional relationship between the viewing position and the printed material (sample) is taken into consideration. That is, in the first embodiment, the print luminance based on the specular reflection of the luminance (brightness of the ceiling and the wall) in the incidence angle direction facing the positional relationship between the viewing position and the printed material is not taken into consideration.

Consequently, in the present embodiment, prediction of the print luminance based on the luminance (hereinafter, luminance in the incidence angle direction) in the incidence angle direction facing the positional relationship between the viewing position and the printed material (sample) is additionally studied. Then, the tone conversion characteristic is set so that "the slopes in the linear areas of the output luminance become the same" in accordance with the reproduction range of the predicted print luminance thereof and further, "the linear area for the luminance of the input image increases".

(Function Configuration of Image Processing Apparatus)

Figure 13:
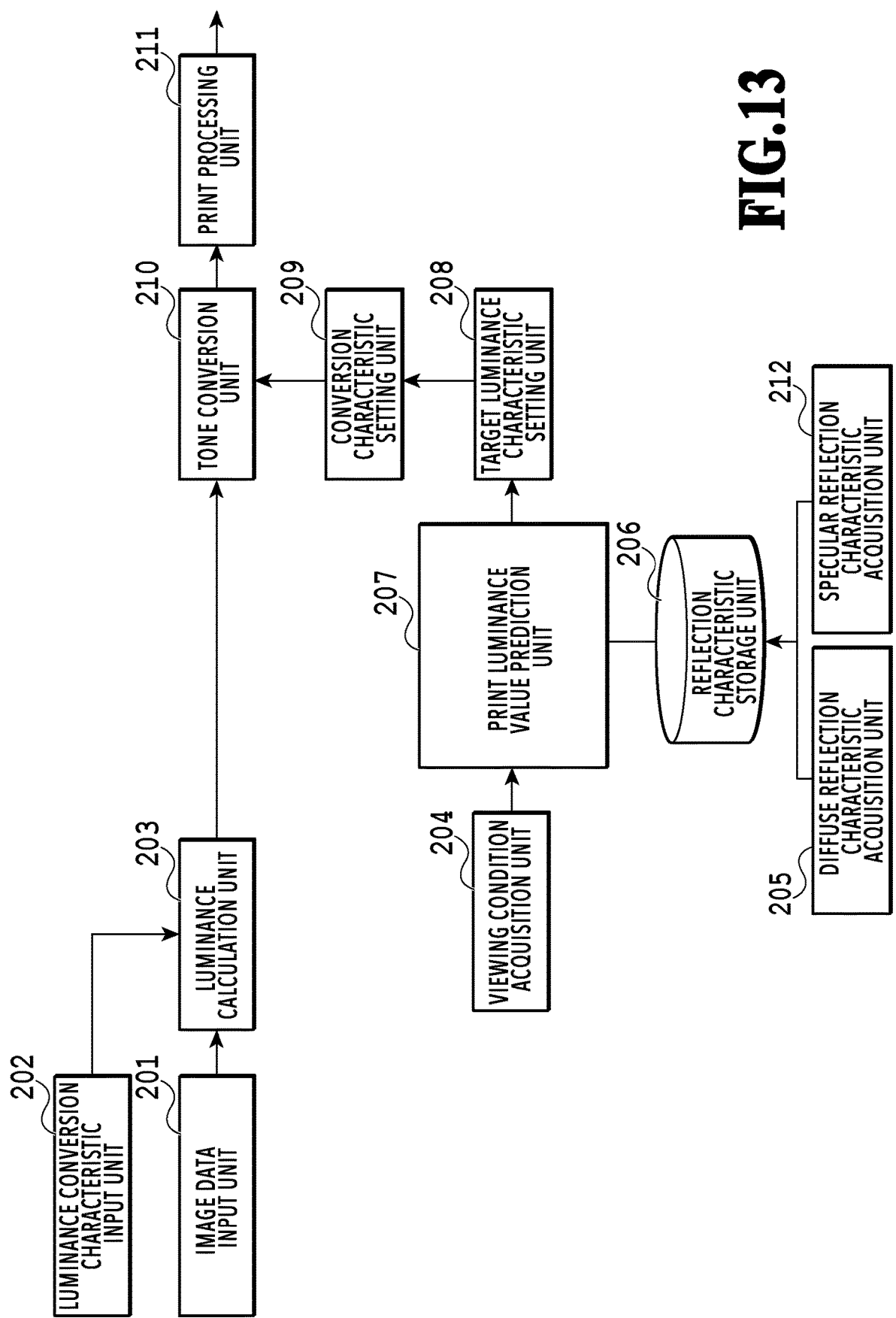
FIG. 13 is a function block diagram of an image processing apparatus.

Next, by using FIG. 13, the function configuration of the image processing apparatus 100 is explained. FIG. 13 is a function block diagram of the image processing apparatus 100. The functions shown in FIG. 13 are implemented by supplying the programs for implementing these functions to the image processing apparatus 100 shown in FIG. 13 and further, the image processing apparatus 100 executing the programs. Other than the viewing condition acquisition unit 204, the diffuse reflection characteristic acquisition unit 205, the reflection characteristic storage unit 206, the print luminance value prediction unit 207, and the print processing unit 211, the functions are the same as those of the image processing apparatus 100 of the first embodiment, and therefore, explanation is omitted here.

The viewing condition acquisition unit 204 acquires the viewing condition set by a user by using a GUI shown in FIG. 17, to be described later. The diffuse reflection characteristic acquisition unit 205 acquires the diffuse reflection characteristic of an image output by the image output apparatus 111 by, for example, a colorimeter. The reflection characteristic storage unit 206 stores, as the printed material reflection characteristic, the diffuse reflection characteristic acquired by the diffuse reflection characteristic acquisition unit 205 and the specular reflection characteristic acquired by a specular reflection characteristic acquisition unit 212. The print luminance value prediction unit 207 calculates (predicts) the diffuse-reflected light of the printed material in the viewing environment and the luminance of the specular reflected light from the illumination intensity acquired by the viewing condition acquisition unit 204, the luminance (brightness of the ceiling/wall) in the incidence angle direction, and the printed material reflection characteristic stored in the reflection characteristic storage unit 206. The specular reflection characteristic acquisition unit 212 acquires the specular reflection characteristic of the image output by the image output apparatus 111 by, for example, a variable angle measuring unit.

Figure 14A:
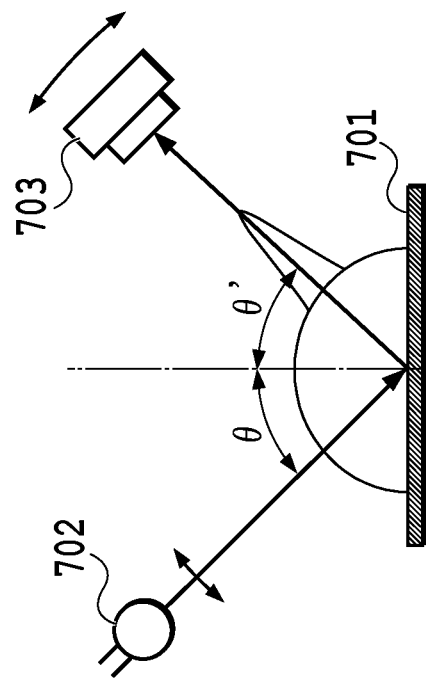
FIG. 14A is a diagram showing a variable angle measuring unit used in measurement of a specular reflection characteristic.
Figure 14B:
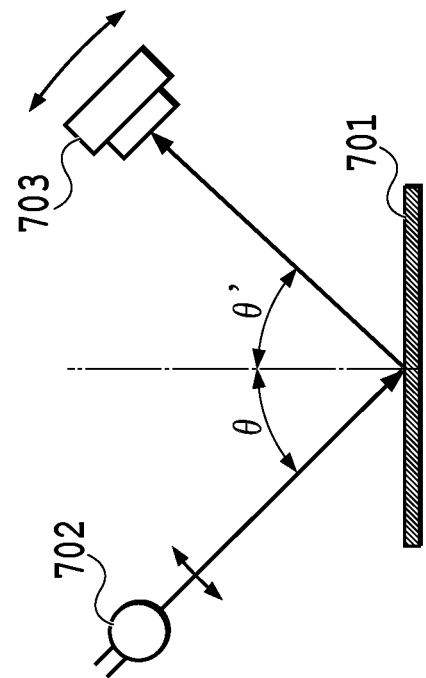
FIG. 14B is a diagram showing the variable angle measuring unit used in measurement of the specular reflection characteristic.

Here, the specular reflection characteristic is measured by a general variable angle measuring unit shown in FIG. 14A and FIG. 14B. Here, the variable angle measuring unit is a device for measuring a conversion characteristic (bidirectional reflectance distribution function: BRDF). Further, the conversion characteristic is a characteristic obtained by measuring the intensity of reflected light for the emitting angle (reflection angle) in a case where light is emitted from a certain angle.

The conversion characteristic is measured by irradiating a printed material 701 with light from illumination light 702 arranged at a position whose projection angle is θ and receiving the reflection intensity of the printed material 701 by a light receiving unit 703 arranged at a position whose light receiving angle is θ' as shown in FIG. 14A. It is possible to measure the reflection intensity in all the directions by varying the projection angle θ and the light receiving angle θ' in the measurement of the conversion characteristic.

Further, FIG. 14B shows a measurement example of the conversion characteristic in a case where general glossy paper is taken as the printed material 701. In FIG. 14B, the reflection intensity is measured by, for example, fixing the projection angle θ at 45 degrees and changing the light receiving angle θ' from −90 degrees to +90 degrees. In FIG. 14B, the light emitted from the illumination light 702 is reflected from the printed material 701 and exhibits a large reflection characteristic in the specular reflection direction (hereinafter, specular reflection characteristic). On the other hand, the printed material 701 exhibits a small reflection characteristic in a direction other than the specular reflection direction (hereinafter, diffuse reflection characteristic).

In the present embodiment, the diffuse reflection characteristic and the specular reflection characteristic are acquired by printing the input RGB image (eight bits) whose luminance is linear on the printer side without performing tone conversion and measuring the light reflected from the printed patch by a spectral colorimeter and a variable angle measuring unit.

The acquisition of these reflection characteristics is performed by printing the input image (white ((R, G, B)=(255, 255, 255)) to black ((R, G, B)=(0, 0, 0)) without performing tone conversion in the tone conversion unit 210 and using the printed patches. The diffuse reflection characteristic and the specular reflection characteristic, which are acquired, are stored in the reflection characteristic storage unit 206 as the printed material reflection characteristic. Further, the reflection characteristic storage unit 206 is allocated to, for example, the storage unit 103 or the like.

In the present embodiment, the printed material reflection characteristics (diffuse reflection characteristic and specular reflection characteristic) are acquired from each portion obtained by equally dividing the portion from the brightest portion (that is, the white patch formed from the image data whose luminance is the highest) to the darkest portion (that is, the black patch formed from the image data whose luminance is the lowest) of the input image data into five portions. Specifically, the input RGB image whose luminance is linear is divided equally into five images on a gray line and the printed material reflection characteristics relating to each piece of image data are acquired. That is, for the five patches of the input image whose luminance is linear (R, G, B)=(255, 255, 255), (192, 192, 192), (128, 128, 128), (64, 64, 64), and (0, 0, 0), the printed material reflection characteristics relating to each piece of image data are acquired.

The number of images (patches) from each of which the printed material reflection characteristics are acquired is not necessarily limited to this. Consequently, for example, it is also possible to acquire the printed material reflection characteristics for all the RGB values (256×256×256 sixteen millions), or for the RGB values (9×9×9=729) obtained by equally thinning the RGB values of 0 to 255 into nine RGB values.

Next, by using FIG. 15, the printed material reflection characteristics (diffuse reflection characteristic and specular reflection characteristic) stored in the reflection characteristic storage unit 206 are explained. FIG. 15 is a diagram showing the printed material reflection characteristics that are stored in the reflection characteristic storage unit 206 and in more detail, showing an example in which the CIEXYZ values of the diffuse reflection characteristic and the specular reflection characteristic corresponding to the input image whose luminance is linear are stored as a table. It is also possible to use the CIELAB values or only the luminance value Yin place of the CIEXYZ values.

In addition, it is not necessary to prepare the same number of values of the CIEXYZ values of the diffuse reflection characteristic (diffuse reflectance) and the specular reflection characteristic (specular reflectance). Specifically, the measurement of the specular reflection characteristic relatively requires time and effort compared to that of the diffuse reflection characteristic, and therefore, it may also be possible to reduce the number of specular reflection characteristics compared to that of diffuse reflection characteristics as shown in FIG. 16.

(Viewing Condition Acquisition Unit)

Next, by using FIG. 17, a GUI provided by the viewing condition acquisition unit 204 is explained. A user sets the viewing conditions by using the GUI shown in FIG. 17. On the GUI shown in FIG. 17, a user selects "Candidate selection" in which the illumination intensity on a printed material and the luminance in the incidence angle direction are input intuitively and "Numerical value setting" in which the illumination intensity and the luminance in the incidence angle direction are input with a numerical value (physical value) by checking a checkbox.

In a case where "Candidate selection" is selected, the illumination intensity is selected from illumination intensity candidates, for example, such as very bright (daytime outdoor), bright (illumination in art museum), moderate (office), and slightly dark (slightly dark office (ordinary home)). In addition, the luminance in the incidence angle direction is selected from luminance candidates in the incidence angle direction, for example, such as very bright (white), bright (bright gray), moderate (gray), and dark (black). To the candidate that is selected as "Candidate selection", the illumination lux and the luminance (brightness of ceiling/wall) in the incidence angle direction corresponding to the candidate are set. For example, in a case where moderate (office) is selected as regards the illuminance lux, the subsequent processing is performed on the assumption that 800 [lx] is selected, and in a case where moderate (gray) is selected as regards the luminance (brightness of ceiling/wall) in the incidence angle direction, the subsequent processing is performed on the assumption that 50 [cd/m$^2$] is selected.

Further, in a case where "Numerical value setting" is selected, as regards the illumination intensity, the illumination intensity (value of illuminance lux (Lx)) on the printed material is input in the text box, or a specific illumination intensity is selected by moving a slider bar to the left or right. In addition, also as regards the luminance in the incidence angle direction, the value of the luminance [cd/m$^2$] of the ceiling or the wall, which enters from the viewing surface, is caused to be input in the text box, or by moving the slide bar to the left and right, a specific luminance in the incidence angle direction is selected. By the above, the illumination intensity with which the surface of the printed material is irradiated and the luminance (brightness of ceiling/wall) in the incidence angle direction are acquired and set by the viewing condition acquisition unit 204.

In the above-described embodiment, although explanation is given by using the illuminance [lx] as the illumination intensity (luminance), the illumination luminance is not necessarily limited to this and for example, it is also possible to use the luminance [cd/m$^2$] and [nit]. In addition, in order to cause the illumination intensity to be input more accurately, it may also be possible to display a note to the effect that the illuminance measurement by an illuminometer on the printed material that is posted, and the measurement of the luminance in the incidence angle direction facing the positional relationship between the viewing angle and the printed material are necessary on the GUI.

(Image Processing)

Next, by using FIG. 8, the image processing in the image processing apparatus 100 is explained. As described above, FIG. 8 is a flowchart showing the procedure of the image processing in the image processing apparatus 100. The processing at S501 to S503 and the processing at S506 to S508 are the same as those of the first embodiment, and therefore, explanation thereof is omitted here.

At S504, first, based on the viewing conditions (illumination intensity Lt [lx], a luminance Wt [cd/m$^2$] in the incidence angle direction), the diffuse reflection characteristic (Pd), and a specular reflection characteristic (Rd), which are acquired, a luminance Cd_P of the diffuse-reflected light and a luminance Cd_R of the specular reflected light of the printed material are calculated. Further, based on the luminance Cd_P of the diffuse-reflected light and the luminance Cd_R of the specular reflected light of the printed material, a total luminance Cd that reaches the eyes of a viewer is calculated by the following formula.

$$Cd\_P = PdY/100 \times Lt/\pi [\text{cd/m}^2] \quad (4)$$

$$Cd\_R = RdY/100 \times Wt [\text{cd/m}^2] \quad (5)$$

Here, π indicates the ratio of the circumference of a circle to its diameter, PdY indicates the Y component in the tri-stimulus values XYZ of the diffuse reflection characteristic, and RdY indicates the Y component in the tri-stimulus values XYZ of the specular reflection characteristic.

$$Cd = Cd\_P + Cd\_R \quad (6)$$

Next, the print luminance value prediction unit 207 determines whether or not the total luminance Cd has been calculated for all the patches (S505). Then, in a case where it is determined that the calculation of the total luminance Cd of the diffuse-reflected light has not been completed for all the patches (No at S505), the image processing apparatus 100 returns the processing to S504 and calculates the total luminance Cd of the diffuse-reflected light for all the patches.

In the present embodiment, for the input RGB image (image whose luminance is linear) obtained by equally dividing the gray line into five portions, the diffuse reflection characteristic and the specular reflection characteristic relating to each piece of image data are acquired. That is, the diffuse reflection characteristic and the specular reflection characteristic relating to each piece of image data are acquired for the five patches of the input images whose luminance is linear (R, G, B)=(255, 255, 255), (192, 192, 192), . . . , (64, 64, 64), and (0, 0, 0).

As explained above, in the present embodiment, in addition to the illumination intensity, the luminance in the incidence angle direction is set. Further, by using the illumination intensity and the luminance in the incidence angle direction, which are set, and the diffuse reflection characteristic and the specular reflection characteristic of the printed material, which are measured in advance, the print luminance perceived by a viewer is predicted. In addition, the example is shown in which the conversion characteristic is set so that "the slopes in the linear areas of the output luminance become the same" in accordance with the reproduction range of the predicted print luminance and "the linear area for the luminance (saturation) of the input image increases", and an image suitable to the viewing environment is generated.

In the embodiment described above, the conversion characteristic is set so that the linear area for the luminance of the input image increases as the reproduction range of the predicted print luminance becomes larger. Note that it may also be possible to predict the print saturation from the tri-stimulus values PdX, PdY, and PdZ of the diffuse reflection characteristic and the tri-stimulus values RdX, RdY, and RdZ of the specular reflection characteristic, which are shown in FIG. 15. Then, it may also be possible to set the conversion characteristic so that "the slopes in the linear areas of the output saturation become the same" in a case where the reproduction range of the predicted print saturation characteristic is different, and "the linear area for the saturation of the input image increases".

Fourth Embodiment

In the first and second embodiments described above, as described above, the example is shown in which the conversion characteristic of the image data is set so that "the slopes in the linear areas of the output luminance become the same" and "the linear area for the luminance (saturation) of the input image increases".

Further, in the third embodiment, in a case where the print luminance is predicted, the luminance in the incidence angle is added as the condition. Then, the example is shown in which the conversion characteristic of the image data is set so that "the slopes in the linear areas of the output luminance become the same" in accordance with the reproduction range of the print luminance and "the linear area for the luminance of the input image increases".

Figure 18:
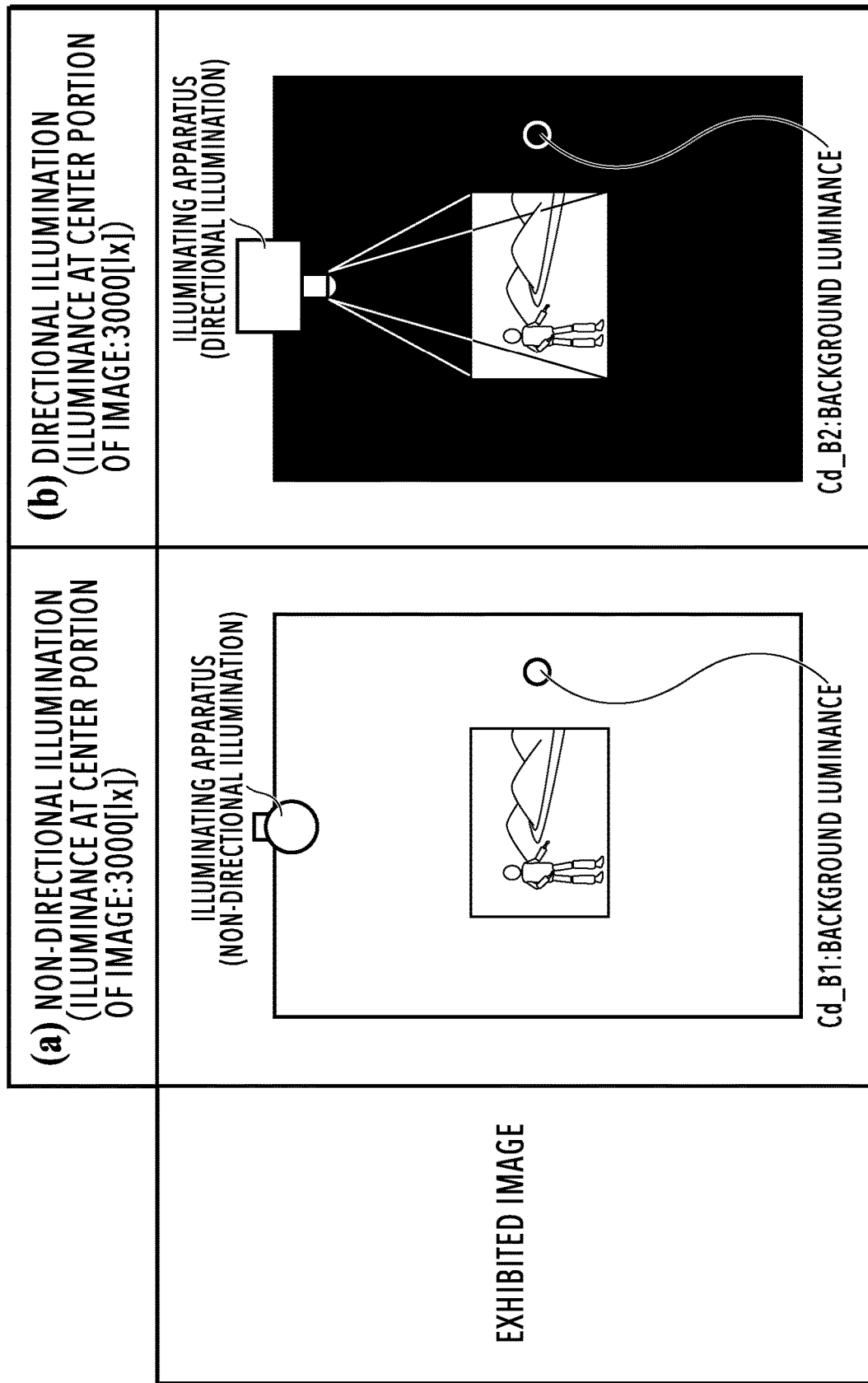
FIG. 18 is a diagram showing a change in density that is perceived resulting from an exhibition environment.

Note that, other than the illumination intensity and the luminance in the incidence angle direction, there is a case where the visual density of the printed material is changed. Here, as in FIG. 18, it is considered that a printed material is hung on the wall and the exhibited printed material (that is, the image printed on the printed material) is viewed. FIG. 18 shows a printed material (image) exhibited by the illumination of an illuminating apparatus having (a) a non-directional illumination in the left field in the table and the printed material (image) exhibited by an illuminating apparatus having (b) a directional illumination in the right field in the table.

In (a) in the left field in the table in FIG. 18, the image is irradiated by the non-directional illumination so that the illumination intensity at the center portion of the image is 3,000 [lx] and each of the image portion and the background of the non-image portion (portion other than the image) is also irradiated by the illumination, and therefore, the whole of the viewing environment becomes bright. That is, a luminance Cd_B1 of the background of the non-image portion becomes bright. The background of the non-image portion is shown as the area other than the printed material (image) of the area of the wall on which the printed material (image) is hung. Further, in FIG. 18, although the area to the right of the image portion is shown as the background of the non-image portion, the area to the left of the image portion, the upper area, or the lower area may be shown as the background of the non-image portion. On the other hand, in (b) in the right field in the table in FIG. 18, the image is irradiated by the directional illumination so that the illumination intensity at the center of the image is 3,000 [lx] and only the image portion is irradiated by the illumination, and therefore, a luminance Cd_B2 of the background of the non-image portion becomes dark.

As a supplement, it is assumed that the intensity of the illumination at the center of the image is 3,000 [lx] and the luminance value distribution of the image portion is the same both in (a) in the left field in the table and in (b) in the right field in the table in FIG. 18. That is, in a case where the luminance of the image portion alone is measured, the luminance of both the image portions indicates the same value.

Here, in a case where the image in (a) in the left field in the table and the image in (b) in the right field in the table in FIG. 18 are viewed, in general, the image (b) in the right field in the table in FIG. 18 is more frequently perceived by a viewer as an image in which the portion from the halftone portion to the highlight portion of the printed material is overexposed. That is, in a case where the printed material is viewed under the directional illumination as in (b) in the right field in the table in FIG. 18, the printed material is viewed as if it were captured with the exposure being increased by a few stops. The reason is that the sense of sight of the viewer adapts to the luminance of the background of the non-image portion which is within the field of view of the viewer in a case of viewing the image.

As regards this point, to be more detail, with (a) the non-directional illumination in the left field in the table in FIG. 18, the background luminance to which the sense of sight of the viewer adapts is comparatively high. Because of this, compared to the luminance to which the sense of sight of the viewer has adapted, the luminance of the brightest portion and the important color portion, such as the skin, of the image is unlikely to become so high. On the other hand, with (b) the directional illumination in the right field in the table in FIG. 18, the background luminance to which the sense of sight of the viewer adapts is comparatively low. Because of this, as described above, the printed material is viewed as if it were captured with the exposure being increased by a few stops and it is perceived that the portion from the halftone portion to the highlight portion is overexposed.

The reason is that the contrast between the background luminance and the luminance of the brightest portion contributes to the change in the visual density of the printed material (image). In the above description, although the contrast between the background luminance and the luminance of the brightest portion is taken, as the luminance of the brightest portion, it may also be possible to take the luminance in a portion whose luminance is comparatively bright, such as the skin portion, or the luminance of the important color, such as the sky.

Figure 19:
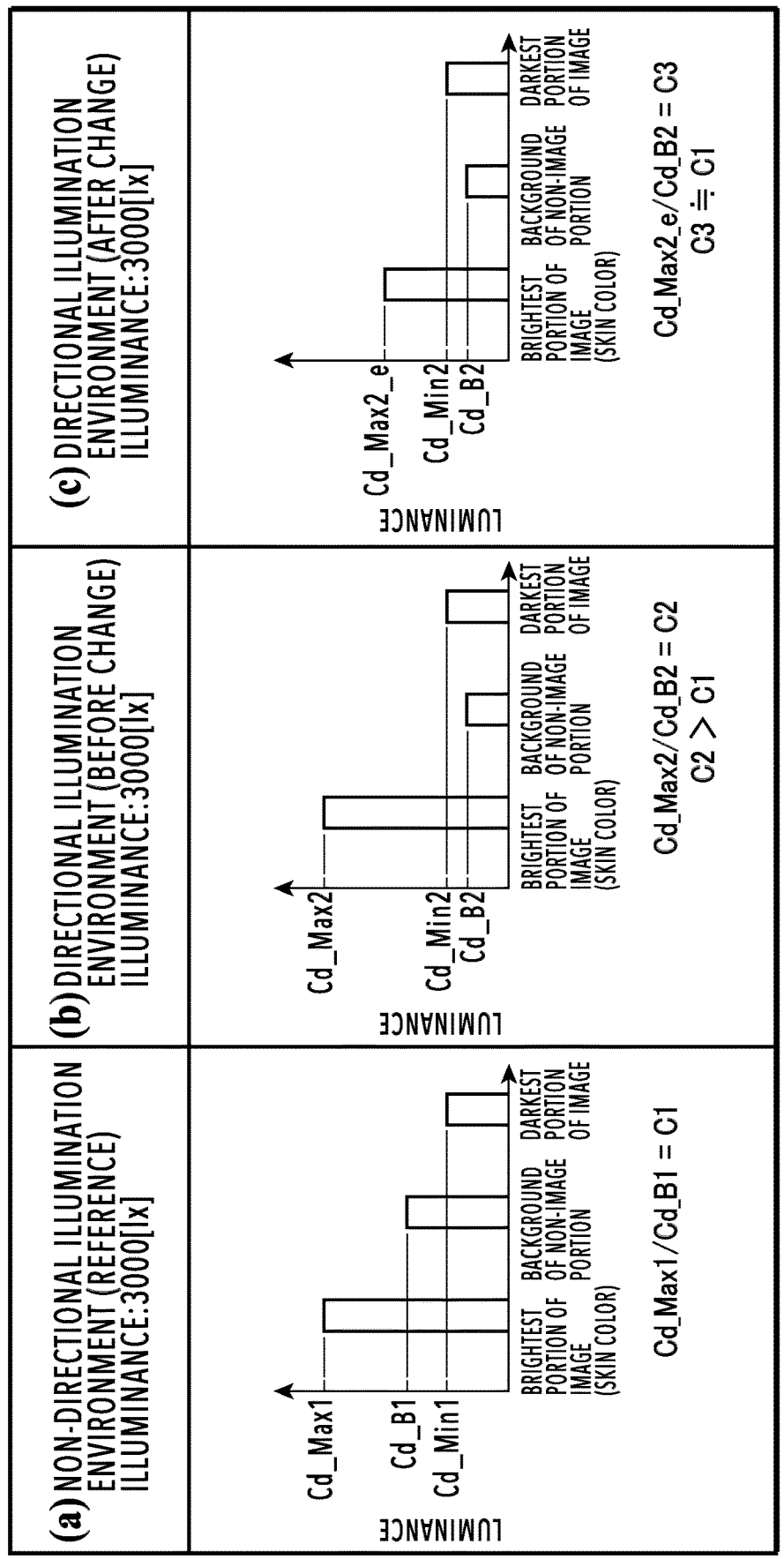
FIG. 19 is a diagram showing luminance of a brightest portion of an image, luminance of a background of a non-image portion, and luminance of a darkest portion of an image in an exhibition environment.

With these in mind, in a case where the difference between the luminance of the image portion and the luminance of the background of the non-image portion is large to a certain extent, suppression of the change in the visual density perceived by a viewer is studied in the following. FIG. 19 is a diagram showing the luminance of the brightest portion of the image in the exhibition environment (non-directional illumination, directional illumination), the luminance of the background of the non-image portion, and the luminance of the darkest portion of the image.

The left field in the table in FIG. 19 shows a luminance (maximum value of print luminance predicted value Cd) Cd_Max1 of the brightest portion of the image, the luminance Cd_B1 of the background of the non-image portion, and a luminance (print luminance minimum value) Cd_Min1 of the darkest portion of the image in (a) a non-directional illumination environment. Here, the contrast value of the luminance Cd_Max1 of the brightest portion of the image to the luminance Cd_B1 of the background of the non-image portion, that is, Cd_Max1/Cd_B1 is taken as C1.

Further, the center field in the table in FIG. 19 shows a luminance (maximum value of print luminance predicted value Cd) Cd_Max2 of the brightest portion of the image, the luminance Cd_B2 of the background of the non-image portion, and a luminance (print luminance minimum value) Cd_Min2 of the darkest portion of the image in (b) a directional illumination environment. Here, the contrast value of the luminance Cd_Max2 of the brightest portion of the image to the luminance Cd_B2 of the background of the non-image portion, that is, Cd_Max2/Cd_B2 is taken as C2.

Here, the illuminance at the image center is 3,000 [lx], and therefore, the luminance distribution of the image portion is the same in (a) in the left field in the table in FIG. 19 and in (b) in the center field in the table. That is, the luminance Cd_Max1 and the luminance Cd_Max2 of the brightest portion of the image indicate substantially the same value. Similarly, the luminance Cd_Min1 and the luminance Cd_Min2 of the darkest portion of the image indicate substantially the same value.

Note that the luminance Cd_B1 and the luminance Cd_B2 of the background of the non-image portion have a relationship of Cd_B1> Cd_B2, and therefore, the luminance to which the sense of the sight of the viewer adapts is different between (a) in the left field in the table and (b) in the center field in the table in FIG. 19 and the image in (b) in the center field in the table in FIG. 19 is perceived as an image that is overexposed. Further, in a case where the contrast value C1 in (a) in the left field in the table in FIG. 19 and the contrast value C2 in (b) in the center field in the table in FIG. 19 are compared, C1<C2 will result.

Consequently, in the present embodiment, as regards (a) in the left field in the table in FIG. 19 and (b) in the center field in the table in FIG. 19, in order to make the same the visual impression of the image, it is studied to make the same the contrast value C1 in (a) in the left field in the table in FIG. 19 and the contrast value C2 in the center field in the table in FIG. 19. Specifically, in FIG. 19, it is studied to change the luminance of the image so that the contrast of the luminance Cd_Max2 of the brightest portion of the image to the luminance Cd_B2 of the background of the non-image portion, that is, Cd_Max2/Cd_B2=C2 and the C1 become substantially the same.

Consequently, for example, by suppressing the luminance of the brightest portion of the image (that is, by reducing the illumination intensity of the illuminating apparatus) so that Cd_Max2 in (b) in the center field in the table in FIG. 19 becomes that as shown by Cd_Max2_e in (c) in the right field in the table in FIG. 19, it is possible to make the contrast value the same as the contrast value C1. Specifically, by reducing the luminance of the brightest portion of the image from Cd_Max2 to Cd_Max2_e, it is possible to make a contrast value C3 of the luminance Cd_Max2_e of the brightest portion of the image to the luminance Cd_B2 of the background of the non-image portion the same as the contrast value C1. That is, it is possible to change the luminance so that the visual impression of the image is the same.

In FIG. 19, although Cd_Max1 and Cd_Max2 are explained as the luminance (print luminance maximum value) of the brightest portion of the image, it may also be possible to take the luminance in a portion whose luminance is comparatively bright, such as the skin portion, or the luminance of the important color, such as the sky. Further, it is also be possible to use a value as the contrast value, which is obtained by subtracting the luminance of the darkest portion of the image from the luminance of the brightest portion of the image and dividing the difference by the luminance of the background of the non-image portion. That is, in a case where (Cd_Max1–Cd_Min1)/Cd_B1 is taken as C1 and (Cd_Max2_e–Cd_Min2)/Cd_B2 is taken as C3, it is also possible to change the luminance of Cd_Max2_e so that C3 and C1 become the same. In either way, by changing the luminance of the brightest portion of the image so that the contrast of the luminance of the brightest portion of the image to the luminance of the background of the non-image portion is the same, it is possible to change the luminance so that the visual impression of the image is the same. In the following, the function (processing) to suppress the change in the visual density perceived by a viewer is explained specifically.

(Function Configuration of Image Processing Apparatus)

The functional configuration of the image processing apparatus according to the present embodiment is the same as that of the image processing apparatus according to the first embodiment, and is shown by the block diagram in FIG. 3. As in the first embodiment, the functions shown in FIG. 3 are implemented by supplying the programs for implementing these functions to the image processing apparatus 100 shown in FIG. 2 and further, the image processing apparatus 100 executing the programs. Other than the viewing condition acquisition unit 204, the print luminance value prediction unit 207, the target luminance characteristic setting unit 208, and the conversion characteristic setting unit 209, the functions thereof are the same as those of the image processing apparatus 100 of the first embodiment, and therefore, explanation is omitted here.

The viewing condition acquisition unit 204 acquires the viewing condition set by a user by using a GUI shown in FIG. 20, to be described later. The print luminance value prediction unit 207 calculates (predicts) the luminance of the diffuse-reflected light of the printed material in the viewing environment from the illumination intensity acquired by the viewing condition acquisition unit 204 and the printed material reflection characteristic stored by the reflection characteristic storage unit 206. The target luminance characteristic setting unit 208 sets the target luminance characteristic to be reproduced as the printed material based on the background luminance (luminance of the background of the non-image portion) perceived by a viewer, which is acquired by the viewing condition acquiring unit 204, and the print luminance predicted by the print luminance value prediction unit 207. The conversion characteristic setting unit 209 sets the tone conversion characteristic for conversion in the tone conversion unit 210 based on the difference between the target luminance characteristic set by the target luminance characteristic setting unit 208 and the print luminance predicted by the print luminance value prediction unit 207.

(Viewing Condition Acquisition Unit)

Next, by using FIG. 20, a GUI provided by the viewing condition acquisition unit 204 is explained. A user sets the viewing conditions by using the GUI shown in FIG. 20. On the GUI shown in FIG. 20, a user selects "Candidate selection" in which the illumination intensity on a printed material and the luminance of the background the non-image portion are input intuitively and "Numerical value setting" in which the illumination intensity and the luminance of the background of the non-image portion are input with a numerical value (physical value) by checking a checkbox. As a supplement, the luminance of the background of the non-image portion in FIG. 20 is, for example, the luminance shown as Cd–B1 and Cd_B2 in FIG. 18 as described above.

In a case where "Candidate selection" is selected, the illumination intensity is selected from illumination intensity candidates, for example, such as very bright (daytime outdoor), bright (illumination in art museum), moderate (office), and slightly dark (slightly dark office (ordinary home)). In addition, the luminance of the background of the non-image portion is selected from candidates of the luminance of the background of the non-image portion, for example, such as very bright (white), bright (bright gray), moderate (gray), and dark (black).

Further, in a case where "Numerical value setting" is selected, as regards the illumination intensity, the illumination intensity (value of illuminance lux (Lx)) on the printed material is input in the text box, or a specific illumination intensity is selected by moving a slider bar to the left or right. In addition, also as regards the background luminance of the non-image portion, similarly, the luminance of the background of the non-image portion perceived by a viewer is input as the luminance value [cd/m$^2$] or a specific luminance of the background of the non-image portion is selected by moving the slider bar to the left and right. To the candidate selected as "Candidate selection", the illuminance lux corresponding to the candidate is set, and for example, in a case where moderate (office) is selected as the illumination intensity, the subsequent processing is performed by regarding that 800 [lx] is selected. Further, similarly, in a case where moderate (gray) is selected as the luminance of the background of the non-image portion, the subsequent processing is performed by regarding that 50 [cd/m$^2$] is selected.

In the embodiment described above, although explanation is given by using the illuminance [lx] as the illumination intensity (luminance), the illumination luminance is not necessarily limited to this, and for example, it may also be possible to use the luminance [cd/m$^2$] and [nit]. In addition, it may also be possible to cause a user to select the non-directional illumination or the directional illumination as the illuminating apparatus. In that case, it may also be possible to perform the setting so that, for example, on a condition that the non-directed illumination is selected, the luminance of the background of the non-image portion is made comparatively high (bright (bright gray)), and on a condition that the directional illumination is selected, the luminance of the background of the non-image portion is made comparatively low (dark (black)). In addition, in order to cause the illumination intensity to be input more accurately, it may also be possible to display a note to the effect that the illuminance measurement by an illuminometer on the printed material that is posted, and the measurement of the luminance of the background of the non-image portion are necessary on the GUI.

(Image Processing)

Next, by using FIG. 8, the image processing in the image processing apparatus 100 is explained. As described above, FIG. 8 is the flowchart showing the procedure of the image processing in the image processing apparatus 100. The processing at step S501 and step S508 is the same as that in the first embodiment, and therefore, explanation thereof is omitted here.

In a case where the image data input by the luminance calculation unit 203 is converted into the input image data whose luminance is linear, the viewing condition acquisition unit 204 acquires the viewing conditions (the illumination intensity Lt [Lx [lx], the luminance Cd_B [cd/m$^2$] of the background of the non-image portion) selected by a user (S502). As a supplement, the luminance of the background of the non-image portion is, for example, the luminance shown as Cd_B1 and Cd_B2 in FIG. 18 as described above.

In a case where the viewing conditions are acquired by the viewing condition acquisition unit 204 (S502), the print luminance value prediction unit 207 acquires the diffuse reflection characteristic (Pd) from the reflection characteristic storage unit 206 (S503). The print luminance value prediction unit 207 calculates the luminance Cd of the diffuse-reflected light of the printed material based on the viewing condition (the illumination intensity Lt [lx]) and the diffuse reflection characteristic (Pd), which are acquired (S504).

The luminance Cd of the diffuse-reflected light of the printed material is calculated by the following formula.

$$Cd = PdY/100 \times Lt/\pi [\text{cd/m}^2] \quad (7)$$

Here, π indicates the ratio of the circumference of a circle to its diameter and PdY indicates the Y component in the tri-stimulus values XYZ of the diffuse reflection characteristic, and PdY has a range between 0.77 and 90.3 as in FIG. 5 of the first embodiment.

The print luminance value prediction unit 207 determines whether or not the luminance Cd of the diffuse-reflected light has been calculated for all the patches (S505). Then, in a case where it is determined that the calculation of the luminance Cd of the diffuse-reflected light has not been completed for all the patches (No at S505), the image processing apparatus 100 returns the processing to S504 and calculates the luminance Cd of the diffuse-reflected light for all the patches.

As described above, in the present embodiment, for the input RGB image (image whose luminance is linear) obtained by equally dividing the gray line into five portions, the diffuse reflection characteristic relating to each piece of image data is acquired. That is, the printed material reflection characteristic relating to each piece of image data is acquired for the five patches of the input images whose luminance is linear (R, G, B)=(255, 255, 255), (192, 192, 192), (128, 128, 128), (64, 64, 64), and (0, 0, 0).

The target luminance characteristic setting unit 208 sets the target luminance characteristic to be reproduced as the printed material based on the luminance Cd of the diffuse-reflected light of the printed material, which is calculated by the print luminance value prediction unit 207 and the luminance Cd_B of the background of the non-image portion, which is acquired by the viewing condition acquisition unit 204 (S506).

In the present embodiment, before setting the target luminance characteristic T_Cd, a tentative target luminance characteristic I_Cd is set. Here, the tentative target luminance characteristic I_Cd is the same as the target luminance characteristic T_Cd in the first embodiment. That is, the tentative target luminance characteristic I_Cd is set so that in a case where the reproduction range of the print luminance characteristic is different, the slope in the linear area of the output luminance in a case where the reproduction range is relatively small and the slope in the linear area of the output luminance in a case where the reproduction range is relatively large become the same.

Figure 22:
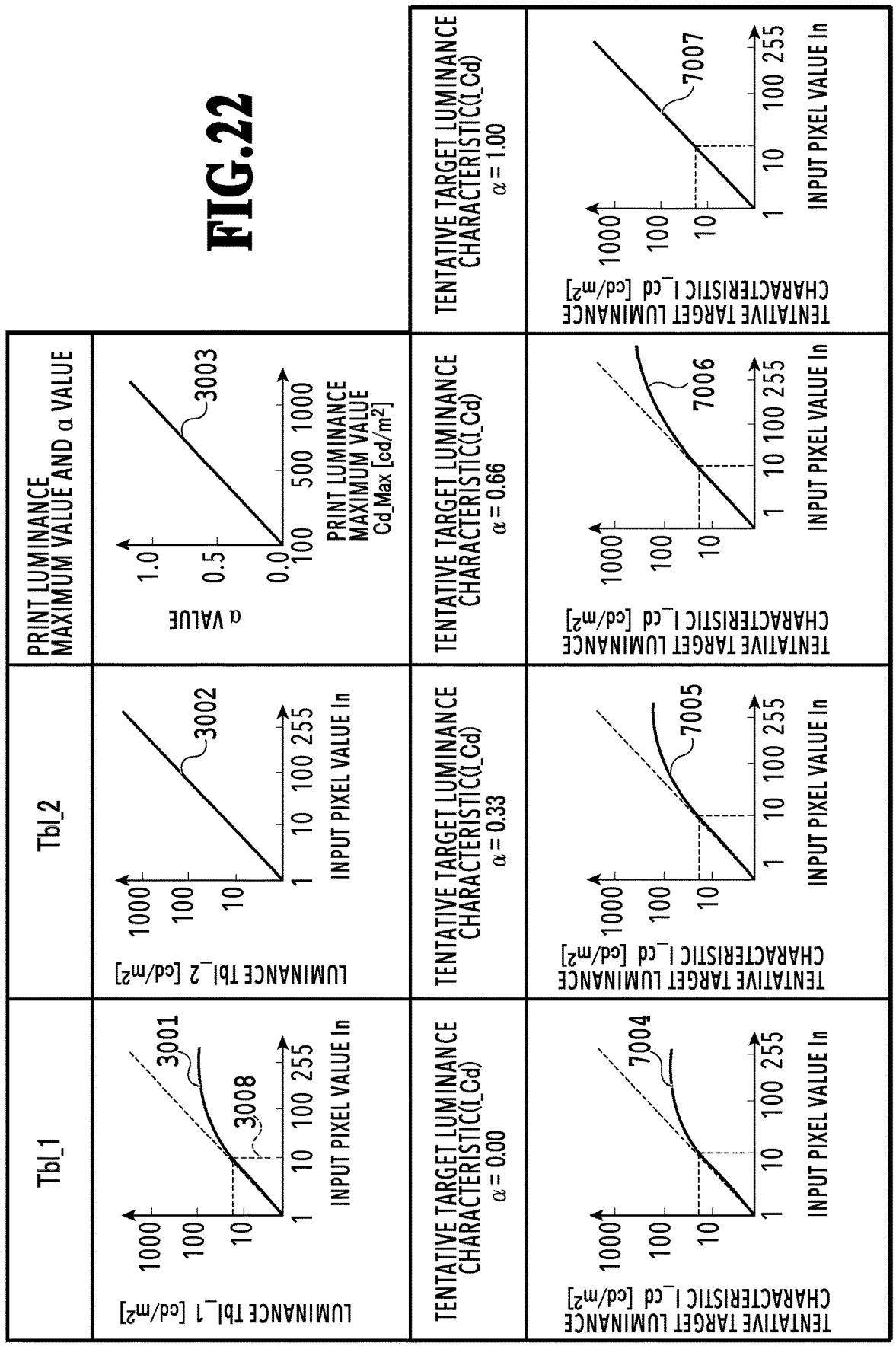
FIG. 22 is a diagram showing a setting method of the tentative target luminance characteristic in the target luminance characteristic setting unit.

Further, the setting method of the tentative target luminance characteristic I_Cd is also the same as the setting method of the target luminance characteristic T_Cd described above at step S506 of the first embodiment. That is, as shown in FIG. 22, the tentative target luminance characteristic I_Cd is calculated from the two different tables (Tbl_1, Tbl_2) prepared in advance and the function of the weighting a value in accordance with the maximum value Cd_Max [cd/m$^2$] of the print luminance predicted value Cd.

Further, here, the maximum value Cd_Max of the print luminance predicted value (luminance of the diffuse-reflected light of the printed material) Cd is also calculated based on formula (7) as in the first embodiment. Consequently, for example, in a case where the illumination intensity in FIG. 19 is 3,000 [lx], the maximum value Cd_Max of the print luminance predicted value Cd is calculated as about 1,000 [cd/m$^2$].

Figure 21:
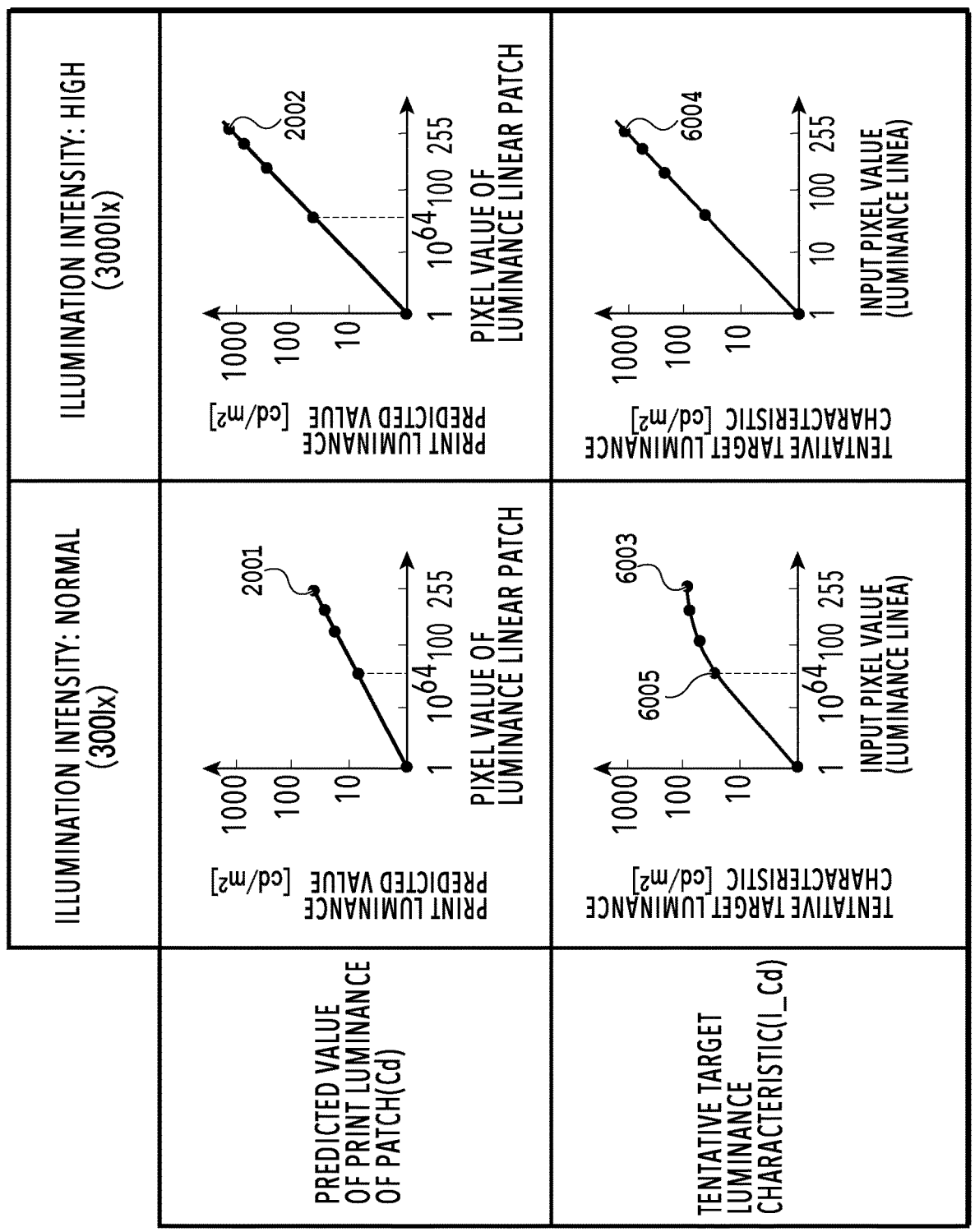
FIG. 21 is a diagram showing a tentative target luminance characteristic.

In the following, the setting method of the tentative target luminance characteristic I_Cd according to the present embodiment is explained supplementally by using FIG. 21. As described above, FIG. 21 shows the print illuminance predicted value Cd of a patch, which is predicted in accordance with the illumination intensity, and the tentative target luminance characteristic I_Cd set based on the print luminance predicted value.

As in the first embodiment, the tentative target luminance characteristic I_Cd in a case where the illumination intensity is normal (300 [lx]) has the linear characteristic in the portion from the shadow portion to the halftone portion (area in which the input pixel value is less than 64 (6005)). Further, in the portion from the halftone portion to the highlight portion (area in which the input pixel value is greater than 64 (6005)), the conversion characteristic bends and has the nonlinear characteristic (6003). On the other hand, the tentative target illuminance characteristic I_Cd in a case where the illumination intensity is high (3,000 [lx]) has the linear characteristic in the portion from the shadow portion to the highlight portion (6004).

In this case, the tentative target luminance characteristic I_Cd that is set in the target luminance characteristic setting unit 208 is calculated based on the following formula as in the first embodiment.

$$I\_Cd(\text{In}) = (1-\alpha(Cd\_\text{Max})) \times Tbl\_1(\text{In}) + \alpha(Cd\_\text{Max}) \times Tbl\_2(\text{In}) \qquad (8)$$

In is the input pixel value (0≤In≤255). Further, Tbl_1 (In) is the luminance value of Tbl_1 in the input pixel value In and Tbl_2 (In) is the luminance value of Tbl_2 in the input pixel value In. Then, the tentative target luminance characteristic I_Cd calculated by the above formula in a case where the weighting a value is varied as α=0.00 (7004), α=0.33 (7005), α=0.66 (7006), and α=1.00 (7007) is shown on the lower side in FIG. 22. By referring to FIG. 22, it is known that the setting is performed so that in a case where the reproduction range of the print luminance characteristic is different, the slope in the linear area of the output luminance in a case where the reproduction range is relatively small and the slope in the linear area of the output luminance in a case where the reproduction range is relatively large become the same. That is, it is known that the tentative target luminance characteristic I_Cd is the same as the target luminance characteristic T_Cd of the first embodiment. As a supplement, in this case, as explained in the second embodiment, it may also be possible to set the target luminance characteristic so that the larger the reproduction range of the predicted print luminance characteristic becomes, the more the linear area increases.

Then, after the tentative target luminance characteristic I_Cd is calculated as described above, next, the target luminance characteristic T_Cd to be reproduced as the printed material is set (calculated) based on the background luminance Cd_B [cd/m$^2$]. In the present embodiment, it is assumed that the background luminance Cd_B in a predetermined environment, the luminance of the brightest portion of the image (the print luminance maximum value) Cd_Max, and the contrast value are stored in advance as a reference target in a case where the target luminance characteristic T_Cd is set. For example, in the a where the predetermined environment is taken as the environment of the non-directional illumination shown in (a) in the left field in the table in FIG. 19, the background luminance Cd_B1, the luminance of the brightest portion of the image (the print luminance maximum value) Cd_Max1, and the contrast value C1=Cd_Max1/Cd_B1 are stored as a reference target.

Here, the target luminance characteristic T_Cd to be reproduced as the printed material (specifically, the target luminance characteristic T_Cd in the environment of the illuminating apparatus having the directional illumination in FIG. 19) is calculated by the following formula. More specifically, the target luminance characteristic T_Cd to be reproduced as the printed material is calculated by the following formula based on the illumination intensity Lt [lx](3,000 [lx] in (b) in the center field in the table in FIG. 19) and the background luminance Cd_B [cd/m$^2$] (Cd_B2 [cd/m$^2$] in (b) in the center field in the table in FIG. 19).

$$T\_Cd = I\_Cd \times C1/C \qquad (9)$$

In the above formula (9), I_Cd is the tentative target luminance characteristic in the calculation-target environment (specifically, the environment in (b) in the center field in the table in FIG. 19). Further, C1 is the contrast value in the predetermined environment (specifically, in the environment in (a) in the left field in the table in FIG. 19), which is taken as a reference target (reference). Furthermore, C is the contrast value in the calculation-target environment of the target luminance characteristic T_Cd and in the present embodiment, is expressed by the following formula as a ratio of the print luminance maximum value Cd_Max to the background luminance Cd_B.

$$C = Cd\_\text{Max}/Cd\_B \qquad (10)$$

That is, in the environment in (b) in the center field in the table in FIG. 19, the contrast value C is expressed as C=Cd_Max2/Cd_B2 based on the above formula.

As described above (that is, as expressed in the above formula (9)), in a case where the contrast value C in the calculation-target environment is great compared to the contrast value C1, which is taken as the reference, the target luminance characteristic T_Cd is set small. On the other hand, in a case where the contrast value C in the calculation-target environment is small compared to the contrast value C1, which is taken as the reference, the target luminance characteristic T_Cd is set great. That is, the target luminance characteristic T_Cd is set so that the contrast value C and the contrast value C1, which is taken as the reference, become the same.

Here, the reason the target luminance characteristic T_Cd is set as expressed by the above formula is to, as described above, suppress a change in visual density perceived by a viewer by making the contrast value the same as the contrast value in the predetermined environment, which is taken as the reference.

In the above description, although explanation is given by defining the contrast as the ratio of the luminance of the brightest portion of the image to the luminance of the background of the non-image portion, the contrast is not necessarily limited to this. Consequently, for example, it may also be possible to calculate the target luminance characteristic T_Cd so that the contrast values become the same by using the luminance in a portion where luminance is comparatively bright, such as the skin portion, or the luminance of the important color, such as the sky in place of the luminance of the brightest portion of the image (print luminance maximum value).

Further, it may also be possible to use a value as the contrast value, which is obtained by subtracting the luminance of the darkest portion of the image from the luminance of the brightest portion of the image and dividing the difference by the luminance of the background of the non-image portion. That is, it may be possible to take the contrast value C as C=(Cd_Max−Cd_Min)/Cd_B. In addition, it may also be possible to perform the logarithmic operation, such as C=Log (Cd_Max/Cd_B) for the contrast value C, or perform the exponential operation, such as C=(Cd_Max/Cd_B)^n (n is a real number) for the contrast value C. In either case, by changing the target luminance characteristic T_Cd so that the contrast value of the luminance of the brightest portion of the image to the luminance of the background of the non-image portion is the same, it is possible to suppress a change in visual density perceived by a viewer. That is, it is possible to make the visual impression of the image substantially the same.

In addition, in the present embodiment, the example is shown in which the tentative target luminance characteristic I_Cd is set so that the slopes in the linear areas of the output luminance become the same even in a case where the reproduction range of the print luminance characteristic is different by using the two different tables. Note that the setting of the tentative target luminance characteristic I_Cd is not necessarily limited to the method described above and for example, it may also be possible to define the target luminance characteristic T_Cd by a spline function and set the curve of the spline function so that the slopes in the linear areas of the output luminance become the same.

Here, returning to FIG. 8, the conversion characteristic setting unit 209 sets the conversion characteristic Out_Tb1 by using the print luminance predicted value Cd of the patch, which is predicted by the print luminance value prediction unit 207, and the target luminance characteristic T_Cd set by the target luminance characteristic setting unit 208 (S507). As in the first embodiment, the conversion characteristic Out_Tbl is set so that the print luminance predicted value Cd becomes the target luminance characteristic T_Cd. The processing to set the conversion characteristic Out_Tbl is the same as that of the first embodiment, and therefore, here, explanation thereof is omitted.

As above, in the present embodiment, the example is shown in which it is possible to suppress a change in visual density perceived by a viewer, which results from that the luminance of the background of the non-image portion is different (that is, the contrast is different).

Fifth Embodiment

In the above-described embodiments, the example is shown in which the conversion characteristic of image data is set so that "the slopes in the linear areas of the output luminance (saturation) become the same" in accordance with the reproduction range of the print luminance (saturation) predicted from the illumination intensity. Further, at the same time, the example is shown in which the conversion characteristic of image data is set so that "the linear area for the luminance (saturation) of the input image increases" in accordance with the reproduction range of the print luminance (saturation) predicted from the illumination intensity.

Note that the conversion characteristic setting target is not necessarily limited to the tone conversion characteristic in the tone conversion unit 210. Consequently, for example, it may also be possible for the print processing unit 211 shown in FIG. 6 described above to set (control) one or all of the CMS processing unit 401, the color separation unit 402, and the halftone processing unit 403.

In this case, it is sufficient for the CMS processing unit 401 to change or set the color profile 404. Further, it is sufficient for the color separation processing unit 402 to change or set the color separation table 405. Furthermore, it is sufficient for the halftone processing unit 403 to change or set the halftone parameter 406. In either case, it is only required for the conversion characteristic of image data to be set so that "the slopes in the linear areas of the output luminance (saturation) become the same" in accordance with the reproduction range of the predicted print luminance (saturation), and in addition to that, "the linear area for the luminance (saturation) increases".

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, it is possible to generate an image in which a visual change depending on the viewing environment is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus that generates, in accordance with intensity of light with which an image printed based on input image data is irradiated, print image data on the image from the input image data, the image processing apparatus comprising:
   at least one memory configured to store instructions; and
   at least one processor communicatively connected to the at least one memory and configured to execute the stored instructions to function as:
      an acquisition unit configured to acquire a viewing condition under which the image is viewed;
      a prediction unit configured to predict a print luminance characteristic corresponding to print image data on the image based on the viewing condition and a reflection characteristic corresponding to print image data on the image;
      a derivation unit configured to derive a target luminance characteristic under the viewing condition based on the print luminance characteristic;
      a setting unit configured to set a tone conversion characteristic that converts the input image data into the print image data on the image based on the print luminance characteristic and the target luminance characteristic;
      a generation unit configured to generate output image data on the image by converting the input image data by using the tone conversion characteristic; and
      an output unit configured to output the print image data generated by the image processing apparatus,
      wherein the derivation unit is configured to derive, in a case where a reproduction range of an illumination intensity in the print luminance characteristic is different for a first case and a second case, the target luminance characteristic so that a linear area of an output luminance in the first case, where the reproduction range is larger than the reproduction range in the second case, is larger than a linear area of an output luminance in the second case.

2. The image processing apparatus according to claim 1, wherein
   the derivation unit is further configured to derive, in the case where the reproduction range of the illumination intensity in the print luminance characteristic is different for the first case and the second case, the target luminance characteristic so that a slope in the linear area of the output luminance in the second case, where the reproduction range is smaller than the reproduction range in the first case, and a slope in the linear area of the output luminance in the first case become the same.

3. The image processing apparatus according to claim 1, wherein
   the acquisition unit is further configured to acquires at least an illumination intensity with which the image is irradiated as the viewing condition and
   the prediction unit is further configured to predicts the reflection characteristic based on at least a diffuse reflection characteristic.

4. The image processing apparatus according to claim 3, wherein
   the acquisition unit is further configured to acquire a luminance in a light incidence angle direction facing a positional relationship between a viewing position and the image as the viewing condition and
   the prediction unit is further configured to predict the reflection characteristic based on a specular reflection characteristic.

5. The image processing apparatus according to claim 4, wherein
   in the reflection characteristic, a number of values of diffuse reflectance possessed as the diffuse reflection characteristic and a number of values of specular reflectance possessed as the specular reflection characteristic are different.

6. The image processing apparatus according to claim 4, wherein
   the diffuse reflection characteristic is measured by a spectrophotometer and the specular reflection characteristic is measured by a variable angle measuring unit.

7. The image processing apparatus according to claim 3, wherein
   the acquisition unit is further configured to acquire a background luminance of a portion other than the image, which is perceived by a viewer, as the viewing condition, and
   the derivation unit is further configured to derive a contrast value of a luminance of a brightest portion of the image to the background luminance in a case where the image is irradiated with a directional illumination and derive the target luminance characteristic based on the print luminance characteristic and the contrast value.

8. The image processing apparatus according to claim 7, wherein
   the derivation unit is further configured to derive the target luminance characteristic so that the derived contrast value and a contrast value of the luminance of the brightest portion of the image to the background luminance in a case where a center part of the image is irradiated with a non-directional illumination whose illumination intensity is equal to an illumination intensity with which the center part of the image is irradiated at the time of derivation of the contrast value become substantially the same.

9. The image processing apparatus according to claim 4, wherein
   the illumination intensity, or the illumination intensity and the luminance in the incidence angle direction are set by a user.

10. The image processing apparatus according to claim 7, wherein
    the illumination intensity, or the illumination intensity and the background luminance of the portion other than the image are set by a user.

11. The image processing apparatus according to claim 1, wherein
    in the input image data, a pixel value and a scene luminance are in a linear relationship.

12. An image processing apparatus that generates, in accordance with intensity of light with which an image printed based on input image data is irradiated, print image data on the image from the input image data, the image processing apparatus comprising:
    at least one memory configured to store instructions; and
    at least one processor communicatively connected to the at least one memory and configured to execute the stored instructions to function as:
       an acquisition unit configured to acquire a viewing condition under which the image is viewed;
       a prediction unit configured to predict a print saturation characteristic corresponding to print image data on the image based on the viewing condition and a reflection characteristic corresponding to print image data on the image;

a derivation unit configured to derive a target saturation characteristic under the viewing condition based on the print saturation characteristic;

a setting unit configured to set a tone conversion characteristic that converts the input image data into the print image data on the image based on the print saturation characteristic and the target saturation characteristic;

a generation unit configured to generate print image data on the image by converting the input image data by using the tone conversion characteristic; and an output unit configured to output the print image data generated by the image processing apparatus, wherein the derivation unit is further configured to derive, in a case where a reproduction range of an illumination intensity in the print saturation characteristic is different for a first case and a second case, the target saturation characteristic so that a linear area of an output saturation in the first case, where the reproduction range is larger than the reproduction range in the second case, is larger than a linear area of an output saturation in the second case.

13. A non-transitory computer readable storage medium storing a program for causing a computer including at least one memory configured to store instructions and at least one processor communicatively connected to the at least one memory and configured to execute the stored instructions to function as an image processing apparatus that generates, in accordance with intensity of light with which an image printed based on input image data is irradiated, print image data on the image from the input image data, where the image processing apparatus comprises:
an acquisition unit configured to acquire a viewing condition under which the image is viewed;

a prediction unit configured to predict a print luminance characteristic corresponding to print image data on the image based on the viewing condition and a reflection characteristic corresponding to print image data on the image;

a derivation unit configured to derive a target luminance characteristic under the viewing condition based on the print luminance characteristic;

a setting unit configured to set a tone conversion characteristic that converts the input image data into the print image data on the image based on the print luminance characteristic and the target luminance characteristic;

a generation unit configured to generate output image data on the image by converting the input image data by using the tone conversion characteristic; and an output unit configured to output the print image data generated by the image processing apparatus, wherein the derivation unit is configured to derive, in a case where a reproduction range of an illumination intensity in the print luminance characteristic is different for a first case and a second case, the target luminance characteristic so that a linear area of an output luminance in the first case, where the reproduction range is larger than the reproduction range in the second case, is larger than a linear area of an output luminance in the second case.

14. An image processing method of generating, in accordance with intensity of light with which an image printed based on input image data is irradiated, print image data on the image from the input image data, the image processing method comprising:

an acquisition step of acquiring a viewing condition under which the image is viewed;

a prediction step of predicting a print luminance characteristic corresponding to print image data on the image based on the viewing condition and a reflection characteristic corresponding to print image data on the image;

a derivation step of deriving a target luminance characteristic under the viewing condition based on the print luminance characteristic;

a setting step of setting a tone conversion characteristic that converts the input image data into the print image data on the image based on the print luminance characteristic and the target luminance characteristic;

a generation step of generating print image data on the image by converting the input image data by using the tone conversion characteristic; and an output step of outputting the generated print image data, wherein, at the derivation step, in a case where a reproduction range of an illumination intensity in the print luminance characteristic is different for a first case and a second case, the target luminance characteristic is derived so that a linear area of an output luminance in the first case, where the reproduction range is larger than the reproduction range in the second case, is larger than a linear area of an output luminance in the second case.

15. The image processing method according to claim 14, wherein, at the derivation step, in the case where the reproduction range of the illumination intensity in the print luminance characteristic is different for the first case and the second case, the target luminance characteristic is derived so that a slope in the linear area of the output luminance in the second case, where the reproduction range is smaller than the reproduction range in the first case, and a slope in the linear area of the output luminance in the first case become the same.

16. The image processing method according to claim 14, wherein at the acquisition step, at least an illumination intensity with which the image is irradiated is acquired as the viewing condition, and at the prediction step, the reflection characteristic is predicted based on at least a diffuse reflection characteristic.

17. The image processing method according to claim 16, wherein at the acquisition step, a luminance in a light incidence angle direction facing a positional relationship between a viewing position and the image is further acquired as the viewing condition and at the prediction step, the reflection characteristic is further predicted based on a specular reflection characteristic.

18. The image processing method according to claim 17, wherein in the reflection characteristic, a number of values of diffuse reflectance possessed as the diffuse reflection characteristic and a number of values of specular reflectance possessed as the specular reflection characteristic are different.

19. The image processing method according to claim 17, wherein
the diffuse reflection characteristic is measured by a spectrophotometer and the specular reflection characteristic is measured by a variable angle measuring unit.

* * * * *